(12) United States Patent
Amundson et al.

(10) Patent No.: US 7,999,787 B2
(45) Date of Patent: Aug. 16, 2011

(54) METHODS FOR DRIVING ELECTROPHORETIC DISPLAYS USING DIELECTROPHORETIC FORCES

(75) Inventors: Karl R. Amundson, Cambridge, MA (US); Alexi C. Arango, Somerville, MA (US); Joseph M. Jacobson, Newton Centre, MA (US); Thomas H. Whitesides, Somerville, MA (US); Michael D. McCreary, Acton, MA (US); Richard J. Paolini, Jr., Framingham, MA (US)

(73) Assignee: E Ink Corporation, Cambridge, MA (US)

( * ) Notice: Subject to any disclaimer, the term of this patent is extended or adjusted under 35 U.S.C. 154(b) by 858 days.

(21) Appl. No.: 11/162,188

(22) Filed: Aug. 31, 2005

(65) Prior Publication Data

US 2006/0038772 A1    Feb. 23, 2006

Related U.S. Application Data

(63) Continuation-in-part of application No. 10/907,140, filed on Mar. 22, 2005, now Pat. No. 7,327,511, application No. 11/162,188, which is a continuation-in-part of application No. 10/687,166, filed on Oct. 16, 2003, now Pat. No. 7,259,744, and a continuation-in-part of application No. 08/983,404, filed as application No. PCT/US96/12000 on Jul. 19, 1996, now Pat. No. 7,106,296, which is a continuation-in-part of application No. 08/504,896, filed on Jul. 20, 1995, now Pat. No. 6,124,851, application No. 11/162,188, which is a continuation-in-part of application No. 10/249,973, filed on May 23, 2003, now Pat. No. 7,193,625.

(60) Provisional application No. 60/605,761, filed on Aug. 31, 2004, provisional application No. 60/555,529, filed on Mar. 23, 2004, provisional application No. 60/585,579, filed on Jul. 7, 2004, provisional application No. 60/419,019, filed on Oct. 16, 2002, provisional application No. 60/319,315, filed on Jun. 13, 2002, provisional application No. 60/319,321, filed on Jun. 18, 2002.

(51) Int. Cl.
*G09G 3/34* (2006.01)

(52) U.S. Cl. ............................................. 345/108

(58) Field of Classification Search ................ None
See application file for complete search history.

(56) References Cited

U.S. PATENT DOCUMENTS 2,932,629 A    4/1960  Wiley et al.
(Continued)

FOREIGN PATENT DOCUMENTS

DE    25 23 763    12/1976
(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — Sumati Lefkowitz
*Assistant Examiner* — Tammy Pham
(74) *Attorney, Agent, or Firm* — David J. Cole

(57) ABSTRACT

A dielectrophoretic display has a substrate having walls defining a cavity, the cavity having a viewing surface and a side wall inclined to the viewing surface. A fluid is contained within the cavity; and a plurality of particles are present in the fluid. There is applied to the substrate an electric field effective to cause dielectrophoretic movement of the particles so that the particles occupy only a minor proportion of the viewing surface.

4 Claims, 14 Drawing Sheets

U.S. PATENT DOCUMENTS

| | | |
|---|---|---|
| 2,934,530 A | 4/1960 | Ballast et al. |
| 3,036,388 A | 5/1962 | Tate |
| 3,668,106 A | 6/1972 | Ota |
| 3,697,150 A | 10/1972 | Wysocki |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 3,960,439 A | 6/1976 | Becker et al. |
| 3,972,040 A | 7/1976 | Hilsum et al. |
| 4,041,481 A | 8/1977 | Sato |
| 4,390,403 A | 6/1983 | Batchelder |
| 4,402,062 A | 8/1983 | Batchelder |
| 4,411,495 A | 10/1983 | Beni et al. |
| 4,418,346 A | 11/1983 | Batchelder |
| 4,430,648 A | 2/1984 | Togashi et al. |
| 4,435,047 A | 3/1984 | Fergason |
| 4,450,440 A | 5/1984 | White |
| 4,605,284 A | 8/1986 | Fergason |
| 4,616,903 A | 10/1986 | Fergason |
| 4,643,528 A | 2/1987 | Bell, Jr. |
| 4,707,080 A | 11/1987 | Fergason |
| 4,741,604 A | 5/1988 | Kornfeld |
| 4,746,917 A | 5/1988 | DiSanto et al. |
| 4,833,060 A | 5/1989 | Nair et al. |
| 4,833,464 A | 5/1989 | DiSanto et al. |
| 4,835,084 A | 5/1989 | Nair et al. |
| 4,919,521 A | 4/1990 | Tada et al. |
| 4,947,157 A | 8/1990 | DiSanto et al. |
| 4,947,159 A | 8/1990 | DiSanto et al. |
| 4,965,131 A | 10/1990 | Nair et al. |
| 4,994,312 A | 2/1991 | Maier et al. |
| 5,055,371 A | 10/1991 | Lee et al. |
| 5,066,946 A | 11/1991 | DiSanto et al. |
| 5,138,472 A | 8/1992 | Jones et al. |
| 5,216,530 A | 6/1993 | Pearlman et al. |
| 5,223,115 A | 6/1993 | DiSanto et al. |
| 5,247,290 A | 9/1993 | DiSanto et al. |
| 5,254,981 A | 10/1993 | DiSanto et al. |
| 5,266,937 A | 11/1993 | DiSanto et al. |
| 5,270,843 A | 12/1993 | Wang |
| 5,293,528 A | 3/1994 | DiSanto et al. |
| 5,302,235 A | 4/1994 | DiSanto et al. |
| 5,354,799 A | 10/1994 | Bennett et al. |
| 5,390,026 A | 2/1995 | Lim |
| 5,411,398 A | 5/1995 | Nakanishi et al. |
| 5,412,398 A | 5/1995 | DiSanto et al. |
| 5,463,491 A | 10/1995 | Check, III |
| 5,463,492 A | 10/1995 | Check, III |
| 5,467,107 A | 11/1995 | DiSanto et al. |
| 5,467,217 A | 11/1995 | Check, III |
| 5,530,567 A | 6/1996 | Takei |
| 5,580,692 A | 12/1996 | Lofftus et al. |
| 5,582,700 A | 12/1996 | Bryning et al. |
| 5,594,562 A | 1/1997 | Sato et al. |
| 5,650,872 A | 7/1997 | Saxe et al. |
| 5,654,732 A | 8/1997 | Katakura |
| 5,659,330 A | 8/1997 | Sheridon |
| 5,684,501 A | 11/1997 | Knapp et al. |
| 5,689,282 A | 11/1997 | Wolfs et al. |
| 5,700,608 A | 12/1997 | Eshelman et al. |
| 5,717,515 A | 2/1998 | Sheridon |
| 5,731,792 A | 3/1998 | Sheridon |
| 5,739,801 A | 4/1998 | Sheridon |
| 5,745,094 A | 4/1998 | Gordon, II et al. |
| 5,760,761 A | 6/1998 | Sheridon |
| 5,777,782 A | 7/1998 | Sheridon |
| 5,798,315 A | 8/1998 | Etoh et al. |
| 5,808,783 A | 9/1998 | Crowley |
| 5,866,284 A | 2/1999 | Vincent |
| 5,872,552 A | 2/1999 | Gordon, II et al. |
| 5,892,504 A | 4/1999 | Knapp |
| 5,896,117 A | 4/1999 | Moon |
| 5,930,026 A | 7/1999 | Jacobson et al. |
| 5,933,203 A | 8/1999 | Wu et al. |
| 5,961,804 A | 10/1999 | Jacobson et al. |
| 5,963,456 A | 10/1999 | Klein et al. |
| 5,978,052 A | 11/1999 | Ilcisin et al. |
| 6,002,384 A | 12/1999 | Tamai et al. |
| 6,017,584 A | 1/2000 | Albert et al. |
| 6,025,896 A | 2/2000 | Hattori et al. |
| 6,034,807 A | 3/2000 | Little et al. |
| 6,054,071 A | 4/2000 | Mikkelsen, Jr. |
| 6,055,091 A | 4/2000 | Sheridon et al. |
| 6,055,180 A | 4/2000 | Gudesen et al. |
| 6,057,814 A | 5/2000 | Kalt |
| 6,064,410 A | 5/2000 | Wen et al. |
| 6,067,185 A | 5/2000 | Albert et al. |
| 6,081,285 A | 6/2000 | Wen et al. |
| 6,097,531 A | 8/2000 | Sheridon |
| 6,113,810 A | 9/2000 | Hou et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,154,190 A | 11/2000 | Yang et al. |
| 6,156,473 A | 12/2000 | Tyagi et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,211,998 B1 | 4/2001 | Sheridon |
| 6,215,540 B1 | 4/2001 | Stephenson |
| 6,215,920 B1 | 4/2001 | Whitehead et al. |
| 6,225,971 B1 | 5/2001 | Gordon, II et al. |
| 6,232,950 B1 | 5/2001 | Albert et al. |
| 6,236,385 B1 | 5/2001 | Nomura et al. |
| 6,239,896 B1 | 5/2001 | Ikeda |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,320,565 B1 | 11/2001 | Albu et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,348,908 B1 | 2/2002 | Richley et al. |
| 6,359,605 B1 | 3/2002 | Knapp et al. |
| 6,373,461 B1 | 4/2002 | Hasegawa et al. |
| 6,376,828 B1 | 4/2002 | Comiskey |
| 6,377,383 B1 | 4/2002 | Whitehead et al. |
| 6,377,387 B1 | 4/2002 | Duthaler et al. |
| 6,392,785 B1 | 5/2002 | Albert et al. |
| 6,392,786 B1 | 5/2002 | Albert |
| 6,407,763 B1 | 6/2002 | Yamaguchi et al. |
| 6,413,790 B1 | 7/2002 | Duthaler et al. |
| 6,421,033 B1 | 7/2002 | Williams et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,462,837 B1 | 10/2002 | Tone |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,498,674 B1 | 12/2002 | Sheridon |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |

| | | | | | | |
|---|---|---|---|---|---|---|
| 6,545,291 B1 | 4/2003 | Amundson et al. | | 7,193,625 B2 | 3/2007 | Danner et al. |
| 6,556,262 B1 | 4/2003 | Stephenson et al. | | 7,202,847 B2 | 4/2007 | Gates |
| 6,580,545 B2 | 6/2003 | Morrison et al. | | 7,202,991 B2 | 4/2007 | Zhang et al. |
| 6,639,578 B1 | 10/2003 | Comiskey et al. | | 7,206,119 B2 | 4/2007 | Honeyman et al. |
| 6,652,075 B2 | 11/2003 | Jacobson | | 7,223,672 B2 | 5/2007 | Kazlas et al. |
| 6,657,612 B2 | 12/2003 | Machida et al. | | 7,230,750 B2 | 6/2007 | Whitesides et al. |
| 6,657,772 B2 | 12/2003 | Loxley | | 7,230,751 B2 | 6/2007 | Whitesides et al. |
| 6,664,944 B1 | 12/2003 | Albert et al. | | 7,236,290 B1 | 6/2007 | Zhang et al. |
| D485,294 S | 1/2004 | Albert | | 7,236,291 B2 | 6/2007 | Kaga et al. |
| 6,672,921 B1 | 1/2004 | Liang et al. | | 7,236,292 B2 | 6/2007 | LeCain et al. |
| 6,680,725 B1 | 1/2004 | Jacobson | | 7,242,513 B2 | 7/2007 | Albert et al. |
| 6,683,333 B2 | 1/2004 | Kazlas et al. | | 7,247,379 B2 | 7/2007 | Pullen et al. |
| 6,693,620 B1 | 2/2004 | Herb et al. | | 7,256,766 B2 | 8/2007 | Albert et al. |
| 6,704,133 B2 | 3/2004 | Gates et al. | | 7,259,744 B2 | 8/2007 | Arango et al. |
| 6,710,540 B1 | 3/2004 | Albert et al. | | 7,280,094 B2 | 10/2007 | Albert |
| 6,721,083 B2 | 4/2004 | Jacobson et al. | | 7,304,634 B2 | 12/2007 | Albert et al. |
| 6,724,519 B1 | 4/2004 | Comiskey et al. | | 7,304,787 B2 | 12/2007 | Whitesides et al. |
| 6,727,881 B1 | 4/2004 | Albert et al. | | 7,312,784 B2 | 12/2007 | Baucom et al. |
| 6,738,039 B2 | 5/2004 | Goden | | 7,312,794 B2 | 12/2007 | Zehner et al. |
| 6,738,050 B2 | 5/2004 | Comiskey et al. | | 7,312,916 B2 | 12/2007 | Pullen et al. |
| 6,750,473 B2 | 6/2004 | Amundson et al. | | 7,321,459 B2 | 1/2008 | Masuda et al. |
| 6,753,844 B2 * | 6/2004 | Machida et al. ............... 345/107 | | 7,327,511 B2 | 2/2008 | Whitesides et al. |
| 6,753,999 B2 | 6/2004 | Zehner et al. | | 7,339,715 B2 | 3/2008 | Webber et al. |
| 6,788,449 B2 | 9/2004 | Liang et al. | | 7,349,148 B2 | 3/2008 | Doshi et al. |
| 6,816,147 B2 | 11/2004 | Albert | | 7,352,353 B2 | 4/2008 | Albert et al. |
| 6,819,471 B2 | 11/2004 | Amundson et al. | | 7,365,394 B2 | 4/2008 | Denis et al. |
| 6,822,782 B2 | 11/2004 | Honeyman et al. | | 7,365,733 B2 | 4/2008 | Duthaler et al. |
| 6,825,068 B2 | 11/2004 | Denis et al. | | 7,375,875 B2 | 5/2008 | Whitesides et al. |
| 6,825,829 B1 | 11/2004 | Albert et al. | | 7,382,363 B2 | 6/2008 | Albert et al. |
| 6,825,970 B2 | 11/2004 | Goenaga et al. | | 7,388,572 B2 | 6/2008 | Duthaler et al. |
| 6,831,769 B2 | 12/2004 | Holman et al. | | 7,391,555 B2 | 6/2008 | Albert et al. |
| 6,839,158 B2 | 1/2005 | Albert et al. | | 7,411,719 B2 | 8/2008 | Paolini, Jr. et al. |
| 6,842,167 B2 | 1/2005 | Albert et al. | | 7,411,720 B2 | 8/2008 | Honeyman et al. |
| 6,842,279 B2 | 1/2005 | Amundson | | 7,420,549 B2 | 9/2008 | Jacobson et al. |
| 6,842,657 B1 | 1/2005 | Drzaic et al. | | 7,442,587 B2 | 10/2008 | Amundson et al. |
| 6,864,875 B2 | 3/2005 | Drzaic et al. | | 7,443,571 B2 | 10/2008 | LeCain et al. |
| 6,865,010 B2 | 3/2005 | Duthaler et al. | | 7,453,445 B2 | 11/2008 | Amundson |
| 6,866,760 B2 | 3/2005 | Paolini Jr. et al. | | 7,492,339 B2 | 2/2009 | Amundson |
| 6,870,657 B1 | 3/2005 | Fitzmaurice et al. | | 7,492,497 B2 | 2/2009 | Paolini, Jr. et al. |
| 6,870,661 B2 | 3/2005 | Pullen et al. | | 7,513,813 B2 | 4/2009 | Paolini, Jr. et al. |
| 6,900,851 B2 | 5/2005 | Morrison et al. | | 7,528,822 B2 | 5/2009 | Amundson et al. |
| 6,922,276 B2 | 7/2005 | Zhang et al. | | 7,532,388 B2 | 5/2009 | Whitesides et al. |
| 6,950,220 B2 | 9/2005 | Abramson et al. | | 7,535,624 B2 | 5/2009 | Amundson et al. |
| 6,956,557 B2 | 10/2005 | Machida et al. | | 7,545,358 B2 | 6/2009 | Gates et al. |
| 6,958,848 B2 | 10/2005 | Cao et al. | | 7,551,346 B2 | 6/2009 | Fazel et al. |
| 6,967,640 B2 | 11/2005 | Albert et al. | | 7,554,712 B2 | 6/2009 | Patry et al. |
| 6,980,196 B1 | 12/2005 | Turner et al. | | 7,561,324 B2 | 7/2009 | Duthaler et al. |
| 6,982,178 B2 | 1/2006 | LeCain et al. | | 7,583,251 B2 | 9/2009 | Arango et al. |
| 6,987,603 B2 | 1/2006 | Paolini, Jr. et al. | | 7,583,427 B2 | 9/2009 | Danner et al. |
| 6,995,550 B2 | 2/2006 | Jacobson et al. | | 7,598,173 B2 | 10/2009 | Ritenour et al. |
| 7,002,728 B2 | 2/2006 | Pullen et al. | | 7,602,374 B2 | 10/2009 | Zehner et al. |
| 7,012,600 B2 | 3/2006 | Zehner et al. | | 2001/0026260 A1 | 10/2001 | Yoneda et al. |
| 7,012,735 B2 | 3/2006 | Honeyman et al. | | 2002/0005832 A1 | 1/2002 | Katase |
| 7,023,420 B2 | 4/2006 | Comiskey et al. | | 2002/0033784 A1 | 3/2002 | Machida et al. |
| 7,030,412 B1 | 4/2006 | Drzaic et al. | | 2002/0060321 A1 | 5/2002 | Kazlas et al. |
| 7,030,854 B2 | 4/2006 | Baucom et al. | | 2002/0090980 A1 | 7/2002 | Wilcox et al. |
| 7,034,783 B2 | 4/2006 | Gates et al. | | 2002/0196207 A1 | 12/2002 | Machida et al. |
| 7,038,655 B2 | 5/2006 | Herb et al. | | 2002/0196219 A1 | 12/2002 | Matsunaga et al. |
| 7,061,663 B2 | 6/2006 | Cao et al. | | 2003/0035198 A1 | 2/2003 | Liang et al. |
| 7,071,913 B2 | 7/2006 | Albert et al. | | 2003/0048522 A1 | 3/2003 | Liang et al. |
| 7,075,502 B1 | 7/2006 | Drzaic et al. | | 2003/0058223 A1 | 3/2003 | Tracy et al. |
| 7,075,703 B2 | 7/2006 | O'Neil et al. | | 2003/0099027 A1 | 5/2003 | Shigehiro et al. |
| 7,079,305 B2 | 7/2006 | Paolini, Jr. et al. | | 2003/0102858 A1 | 6/2003 | Jacobson et al. |
| 7,106,296 B1 | 9/2006 | Jacobson | | 2004/0051934 A1 | 3/2004 | Machida et al. |
| 7,106,297 B2 * | 9/2006 | Shannon et al. ............... 345/107 | | 2004/0105036 A1 | 6/2004 | Danner et al. |
| 7,109,968 B2 | 9/2006 | Albert et al. | | 2004/0112750 A1 | 6/2004 | Jacobson et al. |
| 7,110,163 B2 | 9/2006 | Webber et al. | | 2004/0119681 A1 | 6/2004 | Albert et al. |
| 7,110,164 B2 | 9/2006 | Paolini, Jr. et al. | | 2004/0120024 A1 | 6/2004 | Chen et al. |
| 7,116,318 B2 | 10/2006 | Amundson et al. | | 2004/0180476 A1 | 9/2004 | Kazlas et al. |
| 7,116,466 B2 | 10/2006 | Whitesides et al. | | 2004/0190114 A1 | 9/2004 | Jacobson et al. |
| 7,119,759 B2 | 10/2006 | Zehner et al. | | 2004/0190115 A1 | 9/2004 | Liang et al. |
| 7,119,772 B2 | 10/2006 | Amundson et al. | | 2004/0246562 A1 | 12/2004 | Chung et al. |
| 7,148,128 B2 | 12/2006 | Jacobson | | 2004/0263947 A1 | 12/2004 | Drzaic et al. |
| 7,167,155 B1 | 1/2007 | Albert et al. | | 2005/0001810 A1 | 1/2005 | Yakushiji et al. |
| 7,170,670 B2 | 1/2007 | Webber | | 2005/0001812 A1 | 1/2005 | Amundson et al. |
| 7,173,752 B2 | 2/2007 | Doshi et al. | | 2005/0007336 A1 | 1/2005 | Albert et al. |
| 7,176,880 B2 | 2/2007 | Amundson et al. | | 2005/0012980 A1 | 1/2005 | Wilcox et al. |
| 7,180,649 B2 | 2/2007 | Morrison et al. | | 2005/0018273 A1 | 1/2005 | Honeyman et al. |
| 7,190,008 B2 | 3/2007 | Amundson et al. | | 2005/0067656 A1 | 3/2005 | Denis et al. |

| | | |
|---|---|---|
| 2005/0078099 A1 | 4/2005 | Amundson et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2007/0013683 A1 | 1/2007 | Zhou et al. |
| 2007/0035532 A1 | 2/2007 | Amundson et al. |
| 2007/0052757 A1 | 3/2007 | Jacobson |
| 2007/0057908 A1 | 3/2007 | Jacobson |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200874 A1 | 8/2007 | Amundson et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 | 10/2007 | Sohn et al. |
| 2007/0285385 A1 | 12/2007 | Albert et al. |
| 2008/0013155 A1 | 1/2008 | Honeyman et al. |
| 2008/0013156 A1 | 1/2008 | Whitesides et al. |
| 2008/0023332 A1 | 1/2008 | Webber et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0137176 A1 | 6/2008 | Isobe et al. |
| 2008/0150888 A1 | 6/2008 | Albert et al. |
| 2008/0165122 A1 | 7/2008 | Duthaler et al. |
| 2008/0174853 A1 | 7/2008 | Danner et al. |
| 2008/0211764 A1 | 9/2008 | Albert et al. |
| 2008/0211765 A1 | 9/2008 | Comiskey et al. |
| 2008/0218839 A1 | 9/2008 | Paolini, Jr. et al. |
| 2008/0254272 A1 | 10/2008 | Danner et al. |
| 2008/0264791 A1 | 10/2008 | Paolini, Jr. et al. |
| 2008/0266245 A1 | 10/2008 | Wilcox et al. |
| 2008/0266646 A1 | 10/2008 | Wilcox et al. |
| 2008/0273132 A1 | 11/2008 | Hsu et al. |
| 2008/0291129 A1 | 11/2008 | Harris et al. |
| 2008/0309350 A1 | 12/2008 | Danner et al. |
| 2008/0316582 A1 | 12/2008 | Danner et al. |
| 2009/0000729 A1 | 1/2009 | Danner et al. |
| 2009/0004442 A1 | 1/2009 | Danner |
| 2009/0009852 A1 | 1/2009 | Honeyman et al. |
| 2009/0027762 A1 | 1/2009 | Comiskey et al. |
| 2009/0029527 A1 | 1/2009 | Amundson et al. |
| 2009/0034057 A1 | 2/2009 | LeCain et al. |
| 2009/0040594 A1 | 2/2009 | Albert et al. |
| 2009/0046082 A1 | 2/2009 | Jacobson et al. |
| 2009/0109519 A1 | 4/2009 | Wu et al. |
| 2009/0109522 A1 | 4/2009 | Paolini, Jr. et al. |
| 2009/0122389 A1 | 5/2009 | Whitesides et al. |
| 2009/0168067 A1 | 7/2009 | LeCain et al. |
| 2009/0174651 A1 | 7/2009 | Jacobson et al. |
| 2009/0179923 A1 | 7/2009 | Amundson et al. |
| 2009/0195568 A1 | 8/2009 | Sjodin |
| 2009/0256799 A1 | 10/2009 | Ohkami et al. |

FOREIGN PATENT DOCUMENTS

| | | |
|---|---|---|
| EP | 0 443 571 A2 | 8/1991 |
| EP | 0 659 866 A2 | 6/1995 |
| EP | 1 099 207 B1 | 3/2002 |
| EP | 1 145 072 B1 | 5/2003 |
| JP | 03-053224 A | 3/1991 |
| JP | 03-091722 A | 4/1991 |
| JP | 03-096925 A | 4/1991 |
| JP | 05-173194 A | 7/1993 |
| JP | 06-233131 A | 8/1994 |
| JP | 09-016116 A | 1/1997 |
| JP | 09-185087 A | 7/1997 |
| JP | 09-230391 A | 9/1997 |
| JP | 11-113019 A | 4/1999 |
| WO | WO 99/10870 | 3/1999 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |
| WO | WO 2004/107031 | 12/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Antia, M., "Switchable Reflections Make Electronic Ink", Science, 285, 658 (1999).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bampfield, H.A., and Cooper, J., "Emulsion Explosives", in "Encyclopedia of Emulsion Technology: vol. 3—Basic Theory Measurement Applications", Becher, P. (ed.), Marcel Dekker, New York (1988).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Cameron, N.R., et al., "High Internal Phase Emulsions (HIPEs)—Structure, Properties and Use in Polymer Preparation", Adv. Polym. Sci., 126, 163 (1996).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Hunt, R.W.G., "Measuring Color", 3d. Edn, Fountain Press (ISBN 0 86343 387 1), p. 63 (1998).
Jacobson, J., et al., "The last book", IBM Systems J., 36, 457 (1997).
Ji, Y., et al., "P-50: Polymer Walls in Higher-Polymer-Content Bistable Reflective Cholesteric Displays", SID 96 Digest, 611 (1996).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1 SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
Moesner, F.M., et al., "Devices for Particle Handling by an AC Electric Field", IEEE, 1995, p. 66.
Mossman, M.A., et al., "A New Reflective Color Display Technique Based on Total Internal Reflection and Substractive Color Filtering", SID 01 Digest, 1054 (2001).
O'Regan, B. et al., "A Low Cost, High-efficiency Solar Cell Based on Dye-sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Poor, A., "Feed forward makes LCDs Faster", available at "http://www.extremetech.com/article2/0,3973,10085,00.asp".
Shiffman, R.R., et al., "An Electrophoretic Image Display with Internal NMOS Address Logic and Display Drivers," Proceedings of the SID, 1984, vol. 25, 105 (1984).
Singer, B., et al., "An X-Y Addressable Electrophoretic Display," Proceedings of the SID, 18, 255 (1977).
Vaz, N.A., et al., "Dual-frequency addressing of polymer-dispersed liquid-crystal films", J. Appl. Phys., 65, 5043 (1989).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

METHODS FOR DRIVING ELECTROPHORETIC DISPLAYS USING DIELECTROPHORETIC FORCES

REFERENCE TO RELATED APPLICATIONS

This application claims benefit of provisional Application Ser. No. 60/605,761, filed Aug. 31, 2004.

This application is also a continuation-in-part of application Ser. No. 10/907,140, filed Mar. 22, 2005 (now U.S. Pat. No. 7,327,511), which itself claims benefit of provisional Application Ser. No. 60/555,529, filed Mar. 23, 2004, and of provisional Application Ser. No. 60/585,579, filed Jul. 7, 2004.

This application is also a continuation-in-part of Application Ser. No. 10/687,166, filed Oct. 16, 2003 (Publication No. 2004/0136048, now U.S. Pat. No. 7,259,744), which itself claims benefit of Provisional Application Ser. No. 60/419,019, filed Oct. 16, 2002. application Ser. No. 10/687,166 is also a continuation-in-part of application Ser. No. 08/983,404, filed Mar. 26, 1999 (now U.S. Pat. No. 7,106,296), which is the United States National Phase of International Application No. PCT/US96/12000 (Publication No. WO 97/04398), filed Jul. 19, 1996, which is itself a continuation-in-part of application Ser. No. 08/504,896, filed Jul. 20, 1995 (now U.S. Pat. No. 6,124,851).

This application is also a continuation-in-part of application Ser. No. 10/249,973, filed May 23, 2003 (now U.S. Pat. No. 7,193,625), which itself claims benefit of Application Ser. No. 60/319,315, filed Jun. 13, 2002, and Application Ser. No. 60/319,321, filed Jun. 18, 2002.

The entire contents of all the aforementioned applications, and of all U.S. patents and published and copending applications mentioned below, are herein incorporated by reference.

BACKGROUND OF INVENTION

This invention relates to methods for driving electrophoretic displays using dielectrophoretic forces. More specifically, this invention relates to driving methods for switching particle-based electrophoretic displays between various optical states using electrophoretic and dielectrophoretic forces.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, the transition between the two extreme states may not be a color change at all, but may be a change in some other optical characteristic of the display, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Particle-based electrophoretic displays, in which a plurality of charged particles move through a fluid under the influence of an electric field, have been the subject of intense research and development for a number of years. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also European Patent Applications 1,429,178; 1,462,847; 1,482,354; and 1,484,625; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a fluid, and a capsule wall surrounding the internal phase. Typically, the capsules are themselves held within a polymeric binder to form a coherent layer positioned between two electrodes. Encapsulated media of this type are described, for example, in U.S. Pat. Ser. Nos. 5,930,026; 5,961,804; 6,017,584; 6,067,185; 6,118,426; 6,120,588; 6,120,839; 6,124,851; 6,130,773; 6,130,774;

6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; and 6,922,276; and U.S. Patent Applications Publication Nos. 2002/0060321; 2002/0063661; 2002/0090980; 2002/0113770; 2002/0130832; 2002/0180687; 2003/0011560; 2003/0020844; 2003/0025855; 2003/0102858; 2003/0132908; 2003/0137521; 2003/0214695; 2003/0222315; 2004/0012839; 2004/0014265; 2004/0027327; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0252360; 2004/0257635; 2004/0263947; 2005/0000813; 2005/0001812; 2005/0007336; 2005/0007653; 2005/0012980; 2005/0017944; 2005/0018273; 2005/0024353; 2005/0035941; 2005/0041004; 2005/0062714; 2005/0067656; 2005/0078099; 2005/0105159; 2005/0122284; 2005/0122306; 2005/0122563; 2005/0122564; 2005/0122565; 2005/0151709; and 2005/0152022; and International Applications Publication Nos. WO 99/67678; WO 00/05704; WO 00/38000; WO 00/36560; WO 00/67110; WO 00/67327; WO 01/07961; and WO 03/107,315.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the fluid are not encapsulated within capsules but instead are retained within a plurality of cavities formed within a carrier medium, typically a polymeric film. See, for example, International Application Publication No. WO 02/01281, and U.S. Patent Application Publication No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Ser. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

One potentially important application of shutter mode displays is as light modulators, that is to say to variable transmission windows, mirrors and similar devices designed to modulate the amount of light or other electromagnetic radiation passing therethrough; for convenience, the term "light" will normally be used herein, but this term should be understood in a broad sense to include electro-magnetic radiation at non-visible wavelengths. For example, as mentioned below, the present invention may be applied to provide windows which can modulate infra-red radiation for controlling temperatures within buildings.

As discussed in the aforementioned copending application Ser. No. 10/907,140, one potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Such electronic control can supersede "mechanical" control of incident radiation by, for example, the use of window blinds. Effective implementation of such electronic "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications include of VT technology include privacy glass and glare-guards in electronic devices.

This invention seeks to provide improved drive schemes for electrophoretic displays using electrophoretic and dielectrophoretic forces. This invention is particularly, although not exclusively, intended for use in such displays used as light modulators.

SUMMARY OF THE INVENTION

In one aspect, this invention provides a method for operating a dielectrophoretic display, the method comprising:
  providing a substrate having walls defining at least one cavity, the cavity having a viewing surface; a fluid contained within the cavity; and a plurality of at least one type of particle within the fluid; and
  applying to the substrate an electric field effective to cause dielectrophoretic movement of the particles so that the particles occupy only a minor proportion of the viewing surface.

This aspect of the present invention may hereinafter for convenience be referred to as the "cavity" method of the invention. In one form of this method, the dielectrophoretic movement of the particles causes the particles to move to a side wall of the cavity. In another form of this method, the dielectrophoretic movement causes the particles to form at least one chain extending through the fluid. "Mixed" operation can of course occur with some particles moving to the side wall(s) and other particles forming chains.

In the cavity method, the fluid may be light-transmissive, and preferably transparent. The cavity method may further comprise applying to the substrate a second electric field effective to cause movement of the particles such that they occupy substantially the entire viewing surface, thereby rendering the display substantially opaque. This second electric field may be a direct current electric field, while the (first) electric field used to bring about dielectrophoretic movement of the particles may an alternating electric field, typically one having a frequency of at least about 100 Hz.

In the cavity method, at least some of the at least one type of particle may be electrically charged. There may be more than one type of particle present in the fluid. More specifically, there may be a first type of particle having a first optical characteristic and a first electrophoretic mobility, and a second type of particle having a second optical characteristic different from the first optical characteristic and a second electrophoretic mobility different from the first electrophoretic mobility. The first and second electrophoretic mobilities may differ in sign, so that the first and second types of particles move in opposed directions in an electric field. In this case, the method may further comprise:
  applying an electric field of a first polarity to the cavity, thereby causing the first type of particles to approach the viewing surface and the cavity to display the first optical characteristic at the viewing surface; and
  applying an electric field of a polarity opposite to the first polarity to the cavity, thereby causing the second type of particles to approach the viewing surface and the cavity to display the second optical characteristic at the viewing surface.

As described in the aforementioned copending application Ser. No. 10/687,166, a backing member may be disposed on the opposed side of the cavity from the viewing surface, at least part of the backing member having a third optical characteristic different from the first and second optical characteristics. The backing member may be multi-colored, and may be provided with areas having third and fourth optical characteristics different from each other and from the first and second optical characteristics.

In the cavity method, the at least one type of particle may be formed from an electrically conductive material, such as a metal or carbon black. The dielectrophoretic display may be of any of the types previously discussed. Thus, the substrate may comprise at least one capsule wall so that the dielectrophoretic display comprises at least one capsule. The substrate may comprise a plurality of capsules, the capsules being arranged in a single layer. Alternatively, the substrate may comprise a continuous phase surrounding a plurality of discrete droplets of the fluid having the at least one type of particle therein. In a further form of such a display, the substrate may comprise a substantially rigid material having the at least one cavity formed therein, the substrate further comprising at least one cover member closing the at least one cavity (i.e., the display may be of the aforementioned microcell type).

In a second aspect, this invention provides a method for operating a dielectrophoretic display, the method comprising:
  providing a dielectrophoretic medium comprising a fluid and a plurality of at least one type of particle within the fluid;
  applying to the medium an electric field having a first frequency, thereby causing the particles to undergo electrophoretic motion and producing a first optical state; and
  applying to the medium an electric field having a second frequency higher than the first frequency, thereby causing the particles to undergo dielectrophoretic motion and producing a second optical state different from the first optical state.

This aspect of the present invention may be referred to as the "varying frequency" method of the invention. In such a method, the first frequency may be not greater than about 10 Hz and the second frequency may be at least about 100 Hz. Conveniently, the electric fields have substantially the form of square waves or sine waves, though other waveforms can of course be used. For reasons explained below, it may be advantageous for the second frequency electric field to have a larger magnitude than the first frequency electric field.

Also for reasons explained in detail below, in the varying frequency method, it may be advisable to apply the second frequency electric field in an "interrupted manner" with two or more periods of application of the second frequency electric field separated by one or more periods in which no electric field, or a waveform different from that of the second frequency electric field, is applied. Thus, in one form of the varying frequency method, the application of the second frequency electric field is effected by:
  applying the second frequency electric field for a first period;
  thereafter applying zero electric field for a period; and
  thereafter applying the second frequency electric field for a second period.

In another form of the varying frequency method, the application of the second frequency electric field is effected by:
  applying the second frequency electric field for a first period at a first amplitude;
  thereafter applying the second frequency electric field for a period at a second amplitude less than the first amplitude; and
  thereafter applying the second frequency electric field for a second period at the first amplitude.

In a third form of the varying frequency method, the application of the second frequency electric field is effected by:
  applying the second frequency electric field for a first period;
  thereafter applying for a period an electric field having a frequency less than the second frequency; and
  thereafter applying the second frequency electric field for a second period.

Finally, this invention provides a method for operating a dielectrophoretic display, the method comprising:

providing a dielectrophoretic medium comprising a fluid and a plurality of at least one type of particle within the fluid;

applying to the medium an electric field having a high amplitude, low frequency component and a low amplitude, high frequency component, thereby causing the particles to undergo electrophoretic motion and producing a first optical state; and applying to the medium an electric field having a low amplitude, low frequency component and a high amplitude, high frequency component, thereby causing the particles to undergo dielectrophoretic motion and producing a second optical state different from the first optical state.

This aspect of the present invention may be referred to as the "varying amplitude" method of the invention. In such a method, low frequency components may have frequencies not greater than about 10 Hz and the high frequency components may have frequencies of at least about 100 Hz. The components may have substantially the form of square waves or sine waves.

All aspects of the present invention may make use of any of the types of electrophoretic displays discussed above.

DETAILED DESCRIPTION

Figure 1:
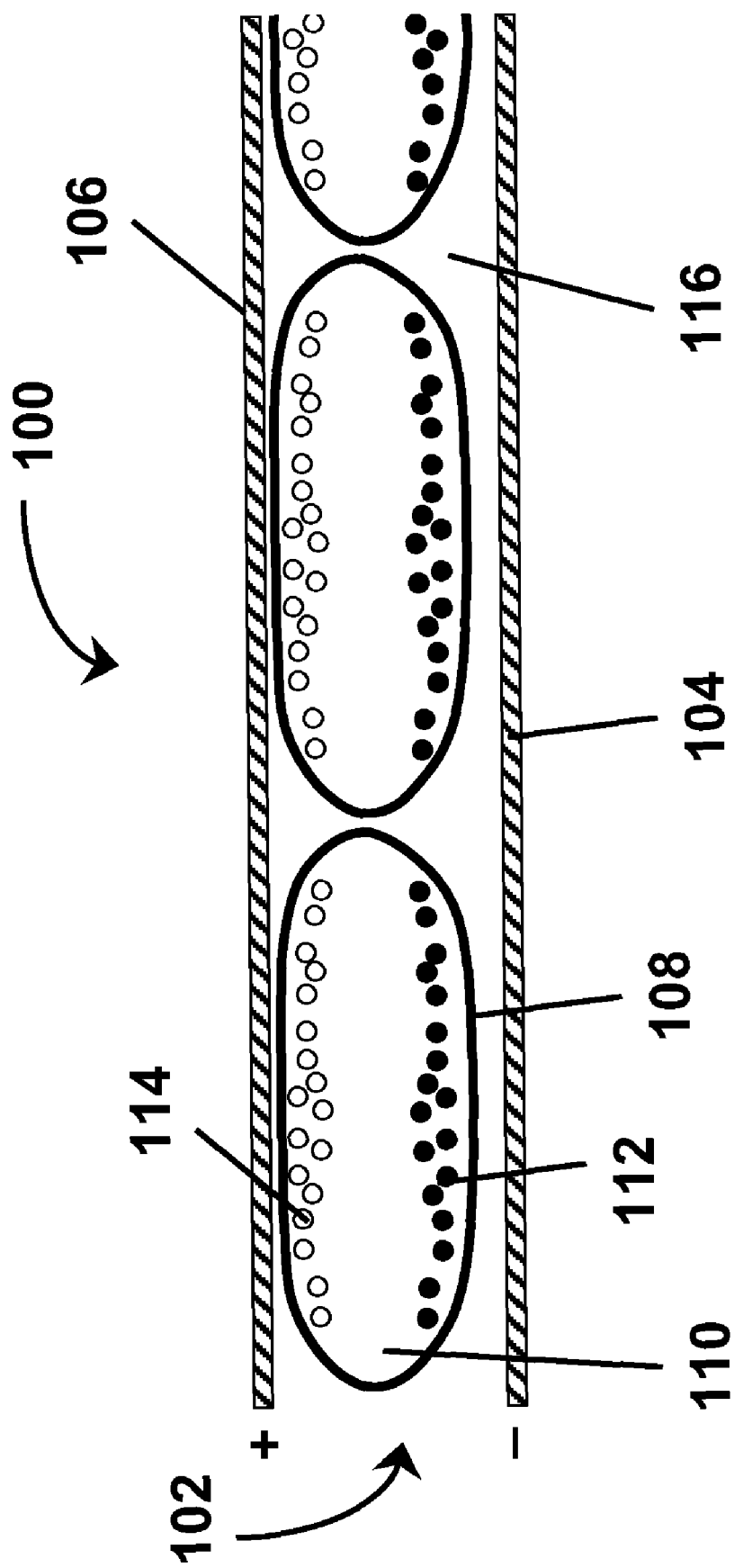
FIG. 1 of the accompanying drawings is a highly schematic cross-section through a dual particle encapsulated electrophoretic display, showing the electrophoretic particles in the positions they assume when subjected to electrophoretic forces.

As indicated above, this invention provides several different methods for operating dielectrophoretic displays. These several methods may be described separately below, but it should be understood that a single display of the present invention may make use of more than one of such methods, either at the same time or as alternative methods of operation at different times. The following description will assume that the reader is familiar with the contents of the aforementioned copending application Ser. Nos. 10/907,140; 10/687,166 and 10/249,973, to which the reader is referred for further details of materials and display construction techniques useful in the displays of the present invention.

However, before describing in detail the various methods of the present invention, it is believed to be desirable to give some more theoretical consideration to electrophoretic and dielectrophoretic movement of particles within an electrophoretic medium.

In an electric field, particles experience a series of translational forces that can be ordered by couplings between various moments of the charge distribution on the particle to the external field or gradients of the external field. The first of these forces, the electrophoretic force, is between the net charge on the particle and the applied field:

$$F_{electrophoretic} = qE \qquad (1)$$

where q is the net particle charge and E is the applied field. This force is first order in the applied field.

The second translational force is a coupling between the particle dipole (induced or permanent) and a gradient in the applied field:

$$F_{dielectrophoretic} = p \cdot \nabla E \qquad (2)$$

Here, p is the electric dipole moment of the particle and $\nabla$ is the gradient operator. This is the dielectrophoretic force. For particles without a permanent dipole, the dipole is induced by the applied field, and is typically linear in the applied field:

$$p = \alpha E \qquad (3)$$

where $\alpha$ is a polarizability of the particle, or, more generally, a polarizability difference from the surrounding fluid. In this case, the dielectrophoretic force is quadratic in the applied field:

$$F_{dielectrophoretic} = \alpha \nabla(E^2)/2 \qquad (4)$$

where E is the magnitude of the electric field E.

The next translational force is a coupling between the electric quadrupole and gradients in the field gradient, and there is a limitless series of additional couplings, all involving higher orders of gradients of the applied field coupled to higher moments of the electric charge distribution. Only electrophoretic and dielectrophoretic forces will be considered herein; the higher-order terms are regarded as insignificant at the practical field strengths applied in electrophoretic displays.

In a pixel of a typical electrophoretic display, the electrophoretic medium (which comprises a plurality of electrically charged particles dispersed in a fluid, and may contain other components, such as capsule walls, a polymeric binder, walls defining microcells, adhesives etc., as described in the aforementioned patents and applications) is in the form of a thin film sandwiched between a pixel electrode, which defines the pixel, and a second electrode, which is typically a common front electrode extending across a plurality of pixels and in many cases the entire display.

Cavity Method of the Invention

FIG. 1 of the accompanying drawings is a highly schematic cross-section through a dual particle encapsulated electrophoretic display (generally designated 100). This display 100 comprises an electrophoretic medium (generally designated 102) in the form of a thin film sandwiched between a pixel electrode 104 and a front plane electrode 106, the latter forming a viewing surface through which an observer views the display. The electrophoretic medium 100 itself comprises a plurality of capsules each having a capsule wall 108 within which are retained a fluid 110, black electrophoretic particles 112 and white electrophoretic particles 114, the particles 112 and 114 bearing charges of opposite polarity. For the sake of illustration, it will be assumed below that the black particles 112 bear positive charges and the white particles 114 bear negative charges, although of course these charges could be reversed. The electrophoretic medium 100 further comprises a polymeric binder 116, which surrounds the capsules and forms them into a mechanically coherent layer. Those skilled in the technology of electrophoretic displays will be aware of numerous variations which can be made in the type of display shown in FIG. 1; for example, the electrophoretic particles and the fluid may be retained in microcells rather than capsules and, when the display is to operate in a shutter mode, with one light-transmissive state and one substantially opaque state, the electrophoretic medium may contain only one type of electrophoretic particle in the fluid, as described below with reference to FIG. 3.

It will be apparent from FIG. 1 that when a voltage difference exists between the electrodes 104 and 106, the electric field to which the electrophoretic medium 102 is subjected is predominantly normal to the plane of this medium. Hence, the electrophoretic forces on the electrophoretic particles 112 and 114 caused by this electric field drive the electrophoretic particles perpendicular to the plane of the medium 102, towards or away from the front electrode 106. For example, as illustrated in FIG. 1, if a positive potential is applied to the front electrode 106 and a negative potential to the pixel electrode 104, the negatively charged white particles 114 are driven adjacent the front electrode 106 and the positively charged black particles are driven adjacent the pixel electrode 104, so that an observer viewing the display through the front electrode 106 sees the white color of the particles 114. Reversing the potentials on the electrodes 104 and 106 interchanges the positions of the particles 112 and 114, so that the observer now sees the black particles 112. By controlled applications of potentials to the electrodes intermediate gray states can also be shown to the observer.

Dielectrophoretic forces offer new modes of particle motion in an electrophoretic cell. From Equation (3) above, it will be seen that particles more polarizable than the surrounding fluid (positive α) are attracted to regions of high electric field strength and particles less polarizable than the surrounding fluid (negative α) are attracted to regions of low electric field strength. The resultant dielectrophoretic forces offer the potential for particle motion or structure formation not available from the electrophoretic force alone.

Figure 2:
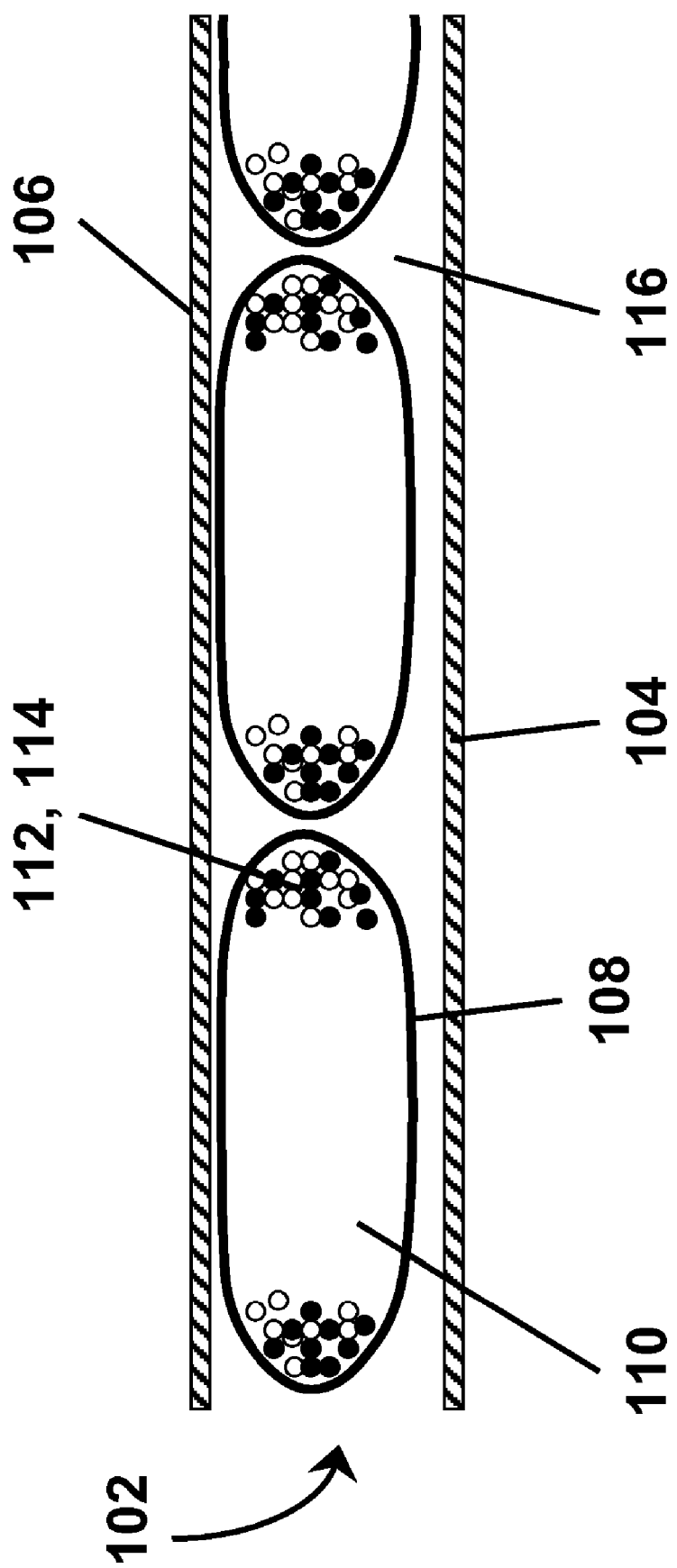
FIG. 2 is a schematic cross-section similar to that of FIG. 1 but showing the electrophoretic particles in the positions they assume when subjected to dielectrophoretic forces.
Figure 3:
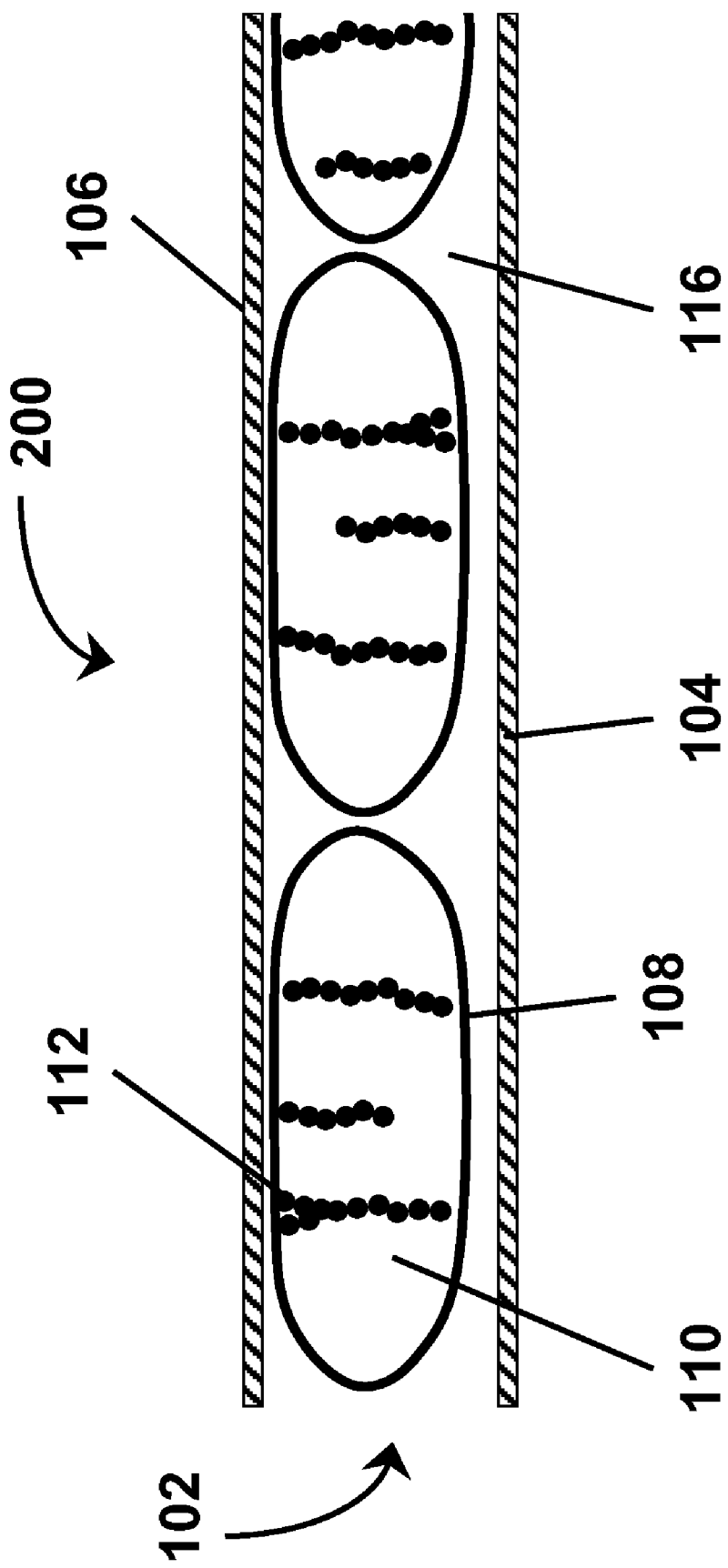
FIG. 3 is a schematic cross-section similar to those of FIGS. 1 and 2 but showing a different electrophoretic display having only a single type of electrophoretic particle, the particles being in the positions they assume when subjected to dielectrophoretic forces.

Two examples of particle configurations that can be achieved through dielectrophoretic forces are illustrated in FIGS. 2 and 3. In the encapsulated electrophoretic display illustrated in FIG. 1, the fluid and electrophoretic particles are contained within capsules held within an external polymeric binder. Because of differences between the dielectric constants and conductivities of the particles, fluid and polymeric binder and/or capsule wall, the particles can be attracted toward or away from side walls of the capsules. For example, if the electrophoretic particles are more polarizable than the fluid, owing to the particles having a larger dielectric constant or a larger electrical conductivity than that of the fluid, and if the external components (capsule wall and/or binder) are also more polarizable than the fluid, then the dielectrophoretic forces will drive the particles toward the side walls of the capsules, where the vertical thickness of the capsules is less than in the middle of the capsule and the electric field magnitude is larger. The particle configuration resulting from dielectrophoretic forces alone is illustrated in FIG. 2, which shows the result of applying such dielectrophoretic forces to the encapsulated display shown in FIG. 1.

A second example of particle configuration resulting from dielectrophoretic forces is shown in FIG. 3. Due to the difference in polarizability of the particles and the fluid, the electric field around a particle is distorted. This distortion has associated with it field gradients that attract and repel other particles in their surroundings through a dielectrophoretic force. This dielectrophoretic force is often referred to as "dipole-dipole" interaction. A swarm of such particles in an electric field will tend to form chains predominantly along the direction of the applied field, as illustrated in FIG. 3, which shows such chaining in an encapsulated electrophoretic display (generally designated 200) similar to the display 100 shown in FIG. 1, except that the white particles 114 are omitted. This chaining can strongly affect the optical state of the display. For example, if the particles that chain under a dielectrophoretic force are white, scattering particles, the chaining will reduce their scattering power. The display will appear more transparent, or, if a black or light absorbing background is employed, the display will appear less white when the particles chain. Alternatively, if the particles absorb light, for example, if the particles are black as illustrated in FIG. 3, then chain formation will render the display more transparent, or, if a white background is employed, then the display will appear brighter. These effects occur because the chaining of particles brings them into a more "clumped" state, where large portions of the viewing surface are free of particles and therefore more light transmissive.

Switching of a display (i.e., shifting the display between its various possible optical states) can be achieved by balancing electrophoretic motion against dielectrophoretic motion, and the various methods of the present invention make use of such balancing.

The cavity method of the present invention is an expanded form of the method for driving a dielectrophoretic display described in the aforementioned copending application Ser. No. 10/687,166, without the limitation that the dielectrophoretic movement of the particles cause the particles to move to the side wall of the cavity; as already noted, the cavity method of the present invention includes cases in which the particles form chains within the fluid rather than moving to a side wall of the cavity. However, the cavity method of the present invention may make use of any of the optional features of the method described in the aforementioned copending application Ser. No. 10/687,166.

Thus, references to "viewing surface" and "side wall" herein do not imply that these surfaces are perpendicular to each other, though a substantially perpendicular arrangement of the two surfaces is preferred when the dielectrophoretic movement of the particles is to the side wall, since when the particles are disposed adjacent the side wall of the cavity, such a perpendicular arrangement minimizes the area of the viewing surface occupied by the particles, and hence permits the maximum amount of light to pass through the cavity. The side wall or walls of the cavity also need not be planar; for example, an encapsulated display of the present invention may use capsules as described in the aforementioned U.S. Pat. No. 6,067,185 having the form of "flattened spheres" (i.e., oblate ellipsoids) with curved side walls.

As already indicated, it is necessary that there be a difference between the dielectric constant and/or conductivity of the fluid and that of the substrate to provide the heterogeneous electric field necessary for dielectrophoresis. Desirably, this difference should be made as large as possible. It may also be advantageous to use a capsule which has a non-circular, and preferably polygonal, cross-section perpendicular to the direction of the applied electric field since sharply curved regions or corners of the capsule produce increased field heterogeneity and thus assist the dielectrophoretic movement of the particles.

Those skilled in the technology of electrophoretic displays will appreciate that both electrically neutral and electrically charged particles can be moved by dielectrophoresis, since dielectrophoretic movement is dependent upon dipoles induced in the particles by the electric field and not upon any pre-existing charge on the particles. However, it appears advantageous to use electrically charged particles in the cavity method of the present invention since once the particles have been moved by dielectrophoresis, it is generally desirable to use normal electrophoretic movement of the particles to re-disperse them; it will be appreciated that since the heterogeneity of the electric field in an encapsulated display is due to differences between the properties of the fluid on the one hand and the capsule wall and surrounding material on the other, there will normally be no way of reversing the high field and low field regions, so that if the particle movement caused by dielectrophoresis is to be reversed, some applied force other than dielectrophoresis must be used.

If electrically charged particles are used in the present cavity method, the particles are of course subject to both electrophoretic and dielectrophoretic forces when an electric field is applied. Typically, electrophoretic movement of particles will be much more rapid than dielectrophoretic, so that to ensure that the desired dielectrophoretic movement is not subject to interference from electrophoretic movement, it is desirable to reverse the electric field at intervals; provided the field is applied for the same amount time in each direction, the electrophoretic movements will sum to zero, since electrophoretic movement is polarity-sensitive, whereas the dielectrophoretic movements will not sum to zero since dielectrophoretic movement is polarity-independent.

Dielectrophoretic movement of particles is affected by the material from which the particles are formed, and the size and shape of the particles. Since dielectrophoresis depends upon the induction of dipoles within the particles, it is desirable to use particles which are highly polarizable, especially conductive particles such as metals. For example, aluminum particles may be used in the present invention. It has been observed experimentally that carbon black particles, which have a reasonably high conductivity, have substantially greater dielectrophoretic mobility than substantially nonconductive titania particles. The particles may also be formed from a doped semiconductor; the type of doping is not critical provided that the particles have sufficient conductivity, but most undoped semiconductors have too low a conductivity to have high dielectrophoretic mobility.

The induced dipole, and hence the dielectrophoretic movement of the particles, is also affected by the size and shape of the particles. Since a large particle allows greater separation between the poles of a dipole than a smaller particle, increasing the size of the particles will increase dielectrophoretic mobility, although of course the particles should not be made so large as to readily visible when in their dielectrophoretically-induced configuration. For similar reasons, elongate particles, especially needle-shaped particles, will tend to have a higher dielectrophoretic mobility than spherical particles of the same volume. Anisotropically shaped particles may also be useful in the present invention.

As already indicated with reference to FIGS. 1 to 3, there are two types of electrophoretic medium used in the cavity method of the present invention. In the first variation, the medium contains only a single type of particle in an uncolored fluid. This capsule can be switched between an "opaque" state, in which the particles are dispersed throughout the fluid, and a "transparent" state, in which the particles are moved to a side wall of the capsule or form chains so that light can pass through the uncolored fluid. The transparent state need not appear transparent to a viewer; as illustrated in the drawings and as described in more detail below, a reflector having a color different from that of the particles may be placed on the opposed side of the capsule from the viewing surface thereof, so that in the transparent state a viewer sees the color of the reflector; in the opaque state the color of the reflector is of course hidden by the dispersed particles.

In the second variation, the medium contain two different types of particles differing in at least one optical characteristic and in electrophoretic mobility and a fluid which may be colored or uncolored. This capsule can be switched among three states, namely a first opaque state, in which the first type of particles are visible, a second opaque state, in which the second type of particles are visible, and a "transparent" state, in which both types of particles are moved by dielectrophoresis and the color of the fluid is visible; if, as will typically be the case, the fluid is uncolored, the transparent state is actually transparent and may be used to display the color of a reflector or filter disposed on the opposed side of the capsule from the viewing surface thereof, as previously described.

It will be appreciated that, provided that the desired color can be seen when the display is in a transparent state, the location of the colored material is essentially irrelevant. Thus, although reference has been made above to a reflector or filter, it is not essential that the reflector be a discrete integer, and color could be provided in any convenient location. Thus, for example, the colored reflector or filter could be provided by coloring (a) the substrate itself, for example the polymeric film used in a microcell form of the present display; (b) a material associated with the substrate, for example a polymeric binder used to retain capsules in a coherent layer in an encapsulated display of the invention, or a lamination adhesive layer used to secure the dielectrophoretic layer to a backplane; or (c) the pixel electrodes or another component of a backplane used to drive the display. In principle, in an encapsulated display color could be provided by dyeing the capsule walls themselves, but this does have the disadvantage that in the opaque state of a pixel the color in the portion of the capsule adjacent the viewing surface will affect the color seen at that surface when the pixel is in an opaque state. In some cases, the resultant color shift may be acceptable, or may be minimized, for example by using particles which have a color complementary to that of the color caused by the capsule wall. In other cases, color may be provided only on the parts of the capsule wall lying on the opposed side of the capsule to the viewing surface, for example by providing a radiation-sensitive color-forming material in the capsule wall and then exposing this color-forming material to radiation effective to bring about the formation of color, this radiation being directed on to the capsule from the side of the display opposite to the viewing surface.

Color could also be provided from a source separate from the display itself. For example, if the display is arranged to operate as a light valve and backlit by projecting light on to a surface on the opposed side of the display from the viewing surface, color could be provided by imaging an appropriate color filter on to the rear surface of the display.

Except in cases where it is essential that the colored member be light transmissive, the color may be provided either by dyes or pigments, although the latter are generally preferred since they are typically more stable against prolonged exposure to radiation, and thus tend to provide displays with longer operating lifetimes.

Special electrode configurations are not always necessary in the cavity method of the present invention; the invention can be practiced with simple parallel electrodes on opposed sides of the cavity; for example, a multi-pixel display of the invention using at least one cavity per pixel could have the conventional electrode configuration of a single pixel electrode for each pixel on one side of the cavities and a single common electrode extending across all the pixels on the opposed side of the cavities. However, this invention does not exclude the possibility that the electrodes might be shaped to enhance the dielectrophoretic effect. It may also be useful to use so-called "z-axis adhesives" (i.e., adhesives having a substantially greater conductivity parallel to the thickness of a layer of adhesive than in the plane of this layer) between one or both of the electrodes and the cavities cf. copending application Ser. No. 10/708,121, filed Feb. 10, 2004 (Publication No. 2004/0252360). In addition, as discussed in detail below with reference to FIGS. 9-11 of the drawings, in some embodiments of the invention it may be advantageous to provide auxiliary electrodes to assist in re-dispersing the particles in the fluid after the particles have be aggregated by dielectrophoresis.

As already indicated, there are several types of dielectrophoretic media which can be used in the present invention. The first type is the "classical" encapsulated electrophoretic type as described in the aforementioned E Ink and MIT patents and applications. In this type of display, the substrate has the form of at least one capsule wall, which is typically deformable, and formed by depositing a film-forming material around a droplet containing the fluid and the dielectrophoretic particles. The second type is the polymer-dispersed electrophoretic type in which the substrate comprises a continuous phase surrounding a plurality of discrete droplets of the fluid. Full details regarding the preparation of this type of display are given in the aforementioned 2002/0131147. The third type is the microcell display, in which a plurality of cavities or recesses are formed in a substrate, filled with the fluid and particles and then sealed, either by lamination a cover sheet over the recesses or by polymerizing a polymerizable species also present in the fluid.

In FIGS. 1 to 3, the capsules are illustrated as being of substantially prismatic form, having a width (parallel to the planes of the electrodes) significantly greater than their height (perpendicular to these planes). This prismatic shape of the capsules is deliberate since it provides the capsules with side walls which extend essentially perpendicular to the viewing surface of the display, thus minimizing the proportion of the area of the capsule which is occupied by the particles in the transparent states shown in FIGS. 2 and 3. Also, if the capsules were essentially spherical, in the state shown in FIG. 1, the particles 114 would tend to gather in the highest part of the capsule, in a limited area centered directly above the center of the capsule. The color seen by the observer would then be essentially the average of this central white area and a dark annulus surrounding this central area, where either the black particles 112 or the substrate would be visible. Thus, even in this supposedly white state, the observer would see a grayish color rather than a pure white, and the contrast between the two extreme optical states of the pixel would be correspondingly limited. In contrast, with the prismatic form of microcapsule shown in FIGS. 1 to 3, the particles 114 cover essentially the entire cross-section of the capsule so that no, or at least very little, black or other colored area is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185. Also, as described in the aforementioned E Ink and MIT patents and applications, to provide mechanical integrity to the dielectrophoretic medium, the capsules 104 are normally embedded within a solid binder.

Figure 4:
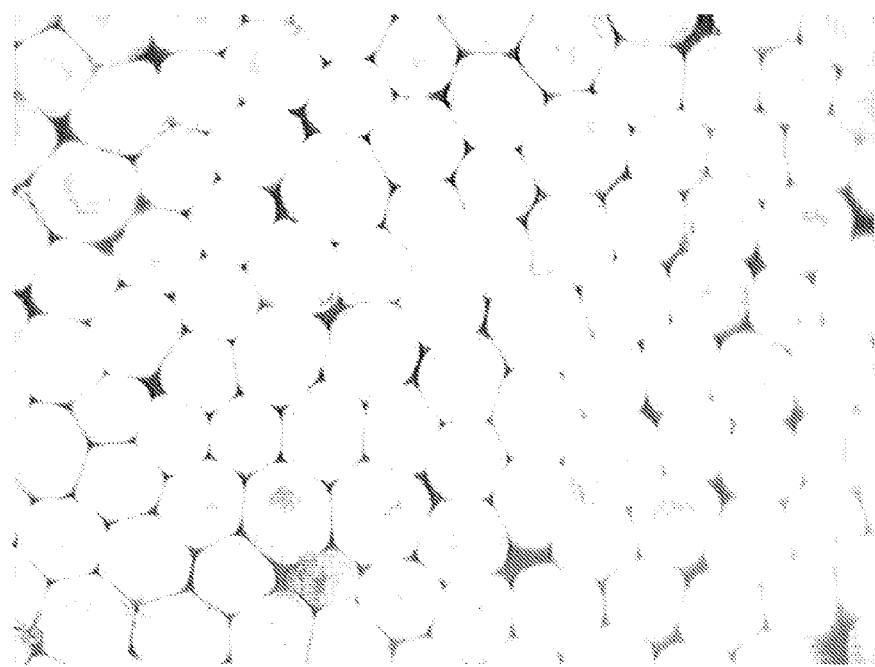
FIGS. 4 to 6 are top plan views through the viewing surface of an experimental display.
Figure 5:
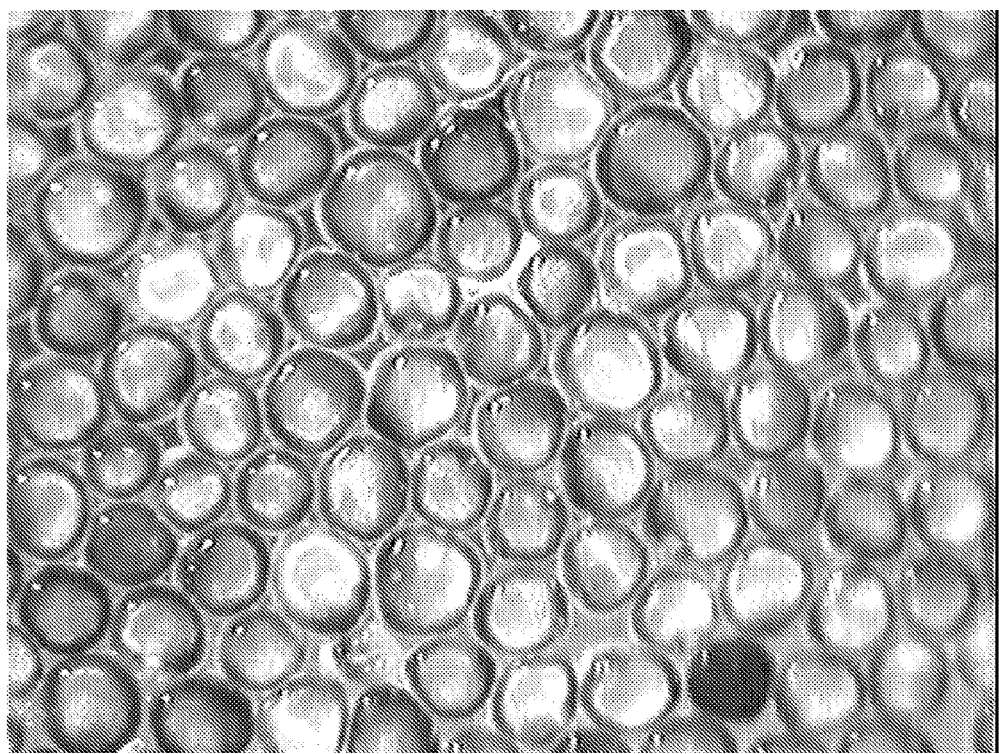
Figure 6:
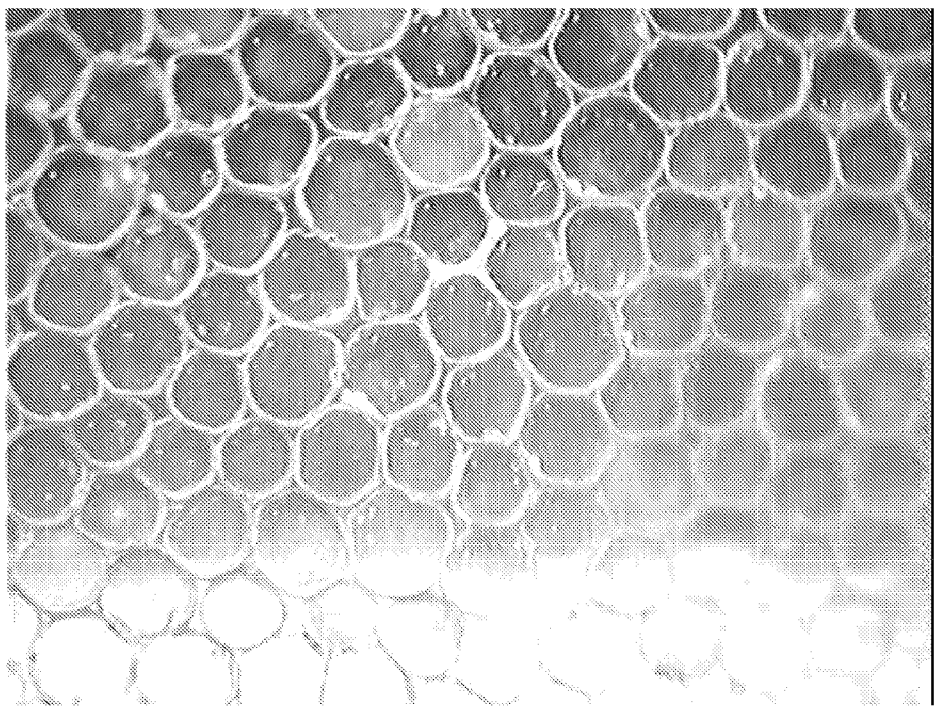

FIGS. 4, 5 and 6 of the accompanying drawings illustrate the white opaque, black opaque and transparent optical states of an experimental display of the present invention substantially as described above with reference to FIGS. 1 and 2 and comprising a plurality of capsules, each of which contains carbon black and white titania particles bearing charges of opposite polarity in a colorless fluid. (FIGS. 4 to 8 are monochrome. For color versions of these Figures, which may be easily comprehensible, the reader is referred to the aforementioned copending application Ser. No. 10/687,166.) The display was prepared substantially as described in the aforementioned 2003/0137717 by encapsulating a hydrocarbon fluid containing carbon black and titania particles in a gelatin/acacia capsule wall, mixing the resultant capsules with a polymeric binder, coating the capsule/binder mixture on to an indium tin oxide (ITO) coated surface of a polymeric film to provide a single layer of capsules covering the film, and laminating the resultant film to a backplane. For purposes of illustration, the display shown in FIGS. 4, 5 and 6 was formed as a single pixel with the transparent front electrode forming the viewing surface of the display, and the backplane (actually a single rear electrode) disposed adjacent a multicolored reflector.

FIG. 4 shows the display in its first, white opaque state corresponding to that of FIG. 1, with the white particles moved by electrophoresis and lying adjacent the viewing surface of the display, so that the white particles hide both the black particles and the multicolored reflector, and the display appears white. Similarly, FIG. 5 shows the display in its second, black opaque state corresponding to that of FIG. 1 but with the positions of the black and white particles reversed, with the black particles moved by electrophoresis and lying adjacent the viewing surface of the display, so that the black particles hide both the white particles and the multicolored reflector, and the display appears black. FIG. 6 shows the display in a transparent state corresponding to that of FIG. 2 caused by applying a square wave with a frequency of 60 Hz and an amplitude of 90V until no further change was visible in the display (approximately 150 seconds). The application of this square wave caused both the black and white particles to move dielectrophoretically to the side walls of the capsules, thus causing the multicolored reflector to be visible through the uncolored fluid. Thus, a display of the type shown in FIGS. 4 to 6 can display three different colors, which eases the problems of building a full color electro-optic display.

Figure 7:
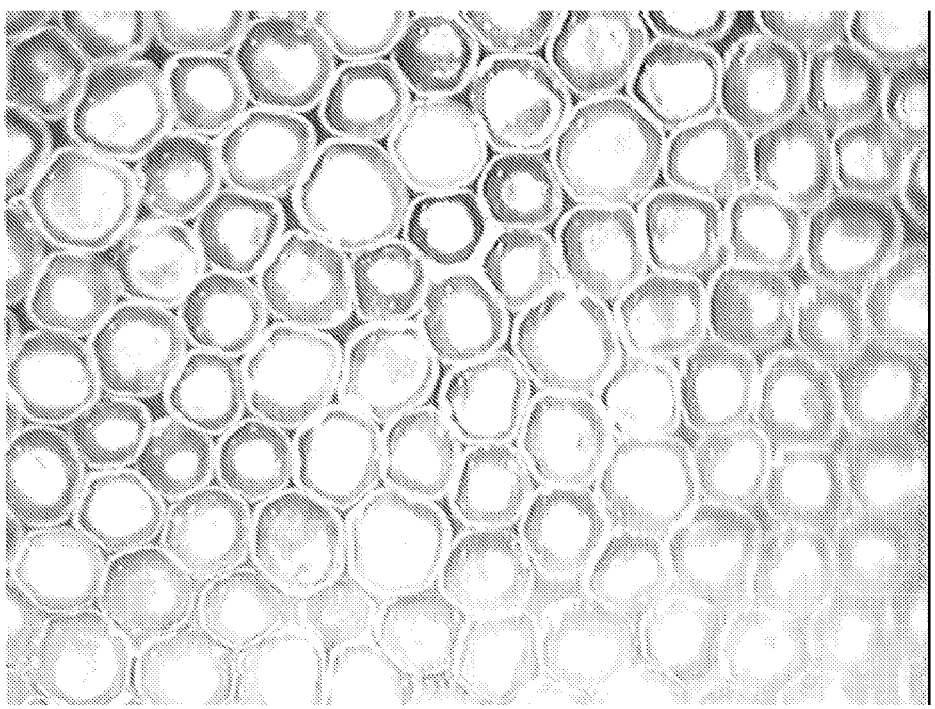
FIGS. 7 and 8 illustrate the transition from the white optical state of the display shown in FIG. 4 to the transparent state shown in FIG. 6.
Figure 8:
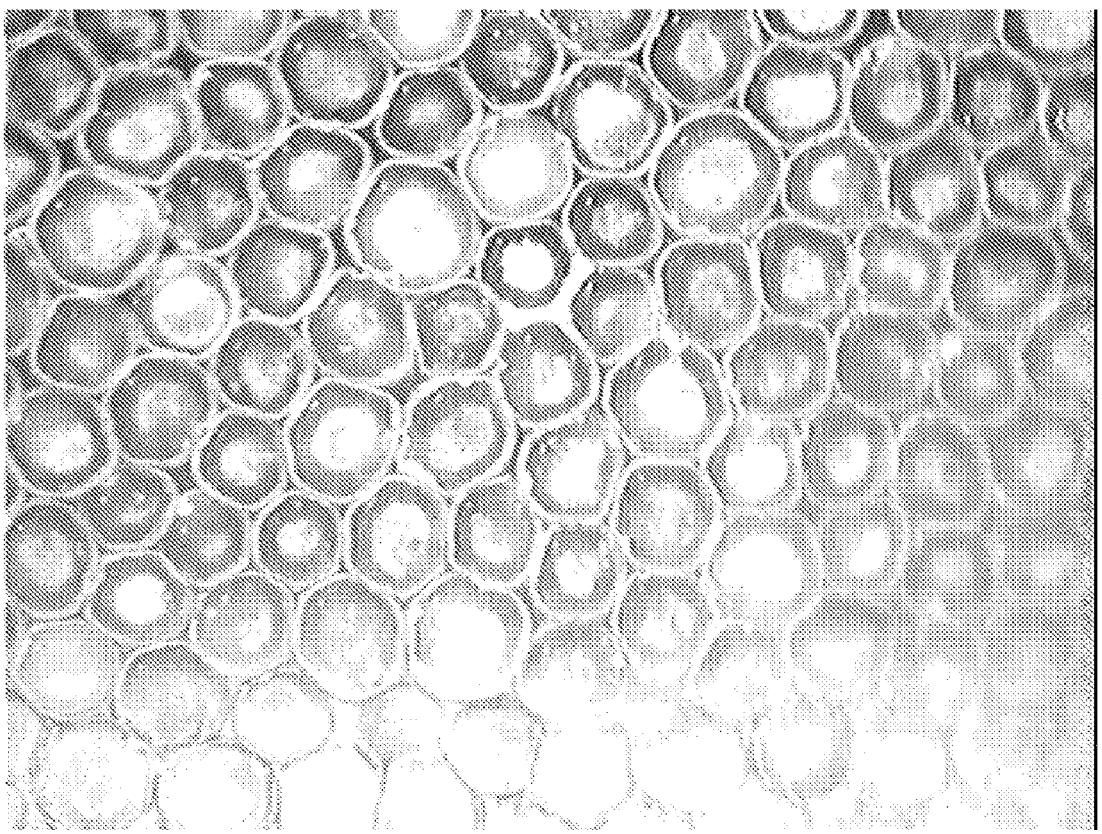

FIGS. 7 and 8 illustrate the transition from the white opaque state shown in FIG. 4 to the transparent state shown in FIG. 6; FIG. 7 shows the display after application of the aforementioned square wave for 10 seconds, while FIG. 8 shows the display after application of the square wave for 30 seconds. It will be seen from FIGS. 6, 7 and 8 that development of the transparent state occurs gradually as more and more particles are moved to the side walls of the capsules. In FIG. 7, the multicolored reflector is just becoming visible, while in FIG. 8 this reflector is more visible but much less clear than in the final transparent state shown in FIG. 6.

Figure 9:
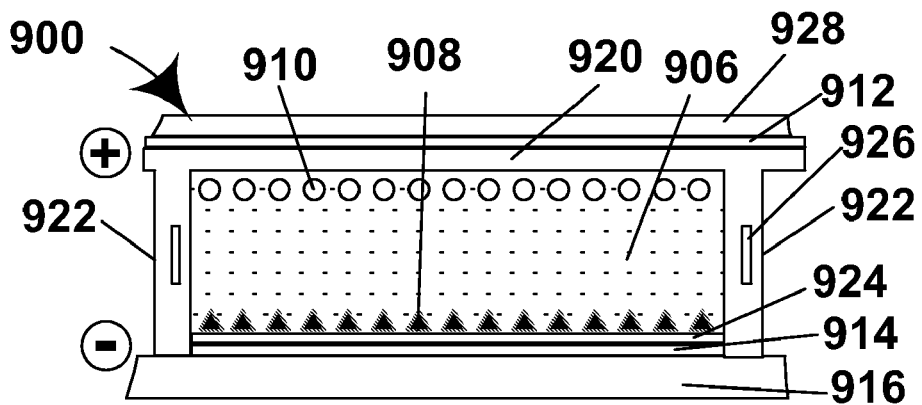
FIGS. 9 to 11 are schematic sections through a microcell display of the present invention in differing optical states.
Figure 10:
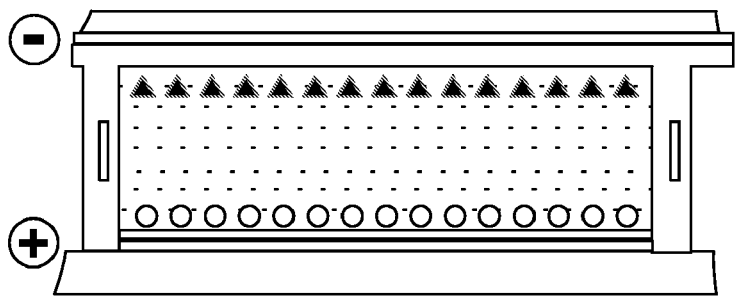
Figure 11:
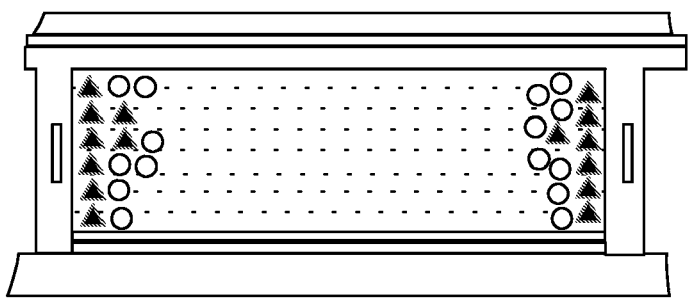

FIGS. 9 to 11 show schematic sections, similar to those of FIGS. 1 and 2, of one pixel of a microcell display (generally designated 900) which can be used in the present invention. The microcell display 900 uses essentially the same type of dielectrophoretic medium as in FIGS. 1 and 2, this medium comprising a liquid 906 with carbon black particles 908 and white titania particles 910 suspended therein; however, the form of substrate used in the display 900 differs substantially. In the display 900, the substrate comprises a base member 920 and a plurality of side walls 922 extending perpendicular to the base member 920 and forming a plurality of microcells in which are confined the liquid 906 and the particles 908 and 910. The lower faces (as illustrated in FIGS. 9 to 11) of the microcells are closed by closure walls 924, which are formed by radiation polymerization of a polymerizable species originally present in the liquid 906; see International Application Publication No. WO 02/01281, and published U.S. Application No. 2002/0075556. The display 900 further comprises a front electrode 912, a rear or pixel electrode 914 and a colored substrate 916. (For simplicity FIGS. 9 to 11 are drawn as if there is only a single microcell to the pixel defined by the electrode 914 although in practice a single pixel may comprise multiple microcells.) The display 900 also comprises auxiliary electrodes 926 embedded within the side walls 922 and a protective layer 928 covering the front electrode 912.

As shown in FIGS. 9 to 11, the microcell display 900 operates in a manner very similar to the encapsulated display 100 shown in FIGS. 1 and 2. FIG. 9 shows the display 900 with the front electrode 912 positively charged relative to the rear electrode 914 of the illustrated pixel. The positively charged particles 908 are held electrostatically adjacent the rear electrode 914, while the negatively charged particles 910 are held electrostatically against the front electrode 912. Accordingly, an observer viewing the display 900 through the front electrode 912 sees a white pixel, since the white particles 910 are visible and hide the black particles 908.

FIG. 10 shows the display 900 with the front electrode 912 negatively charged relative to the rear electrode 914 of the illustrated pixel. The positively charged particles 908 are now electrostatically attracted to the negative front electrode 912, while the negatively charged particles 910 are electrostatically attracted to the positive rear electrode 914. Accordingly, the particles 908 move adjacent the front electrode 912, and the pixel displays the black color of the particles 908, which hide the white particles 910.

FIG. 11 shows the display 900 after application of an alternating electric field between the front and rear electrodes 912 and 914 respectively. The application of the alternating electric field causes dielectrophoretic movement of both types of particles 908 and 910 to the side walls of the microcell, thus leaving the major portion of the area of the microcell essentially transparent. Accordingly, the pixel displays the color of the substrate 916.

Re-dispersion of the particles 908 and 910 from the transparent state of the display 900 shown in FIG. 11 may be effected by applying electrophoretic forces to the particles in the same way as described above. However, the auxiliary electrodes 926 are provided to assist in such redispersion. The auxiliary electrodes run the full width of the display (which is assumed to be perpendicular to the plane of FIGS. 9 to 11), i.e., each auxiliary electrode is associated with a full row of microcells, and the auxiliary electrodes are connected to a voltage source which, when activated, applies voltages of opposed polarities to alternate auxiliary electrodes 926. By applying a series of voltage pulses of alternating polarity to the auxiliary electrodes 926, an electric field is created in the left-right direction in FIGS. 9 to 11, which greatly assists is re-dispersing all the particles 908 and 910 throughout the display uniformly within the liquid 906. Voltage pulses of alternating polarity may also be applied to the electrodes 912 and 914 to further assist in re-dispersing the particles 908 and 910.

It will be appreciated that the present invention need not make use of a colored reflector behind the capsules but may be used to provide backlit displays, variable transmission windows and transparent displays; indeed, the present invention may be useful in any where light modulation is desired.

Varying Frequency Method of the Invention

As already noted, electrophoretic particle motion drives electrophoretic particles to be relatively uniformly distributed across the viewing surface, and across the pixel or capsules or microcells containing the particles. These configurations are hereinafter referred to as "electrophoretic-induced particle configurations", and an example of such a configuration has been discussed above with reference to FIG. 1. This configuration is driven by the attraction between the charged particles and an oppositely-charged electrode. An oscillatory waveform with a sufficiently low frequency to drive the electrophoretic particles a large fraction of the maximum distance which the particles can travel perpendicular to the thickness of the electrophoretic medium (for example, greater than 60% of the maximum distance, and preferably more than 80% of the maximum distance) will drive the particles to an electrophoretically-induced configuration. Such an oscillatory waveform can be sinusoidal, a square wave (two voltage levels), triangular, or have another periodic waveform. For simplicity of driving, the square wave using only two voltages and the sine wave are advantageous.

In such a drive scheme, as the frequency of the drive waveform increases, the amplitude of the electrophoretic motion decreases. Except where particle motion is impeded by a solid object (such as the wall of a capsule in an encapsulated electrophoretic medium), the distance of travel of a particle under electrophoretic force is approximately:

$$\Delta x_{electrophoretic} \approx \mu <E> t \qquad (5)$$

where $\mu$ is the electrophoretic mobility, $<E>$ is the time-average electric field, and t is the time that the electric field has a particular direction. This time, t, is equal to half the period of a sinusoidal or square wave, for example. For a particular waveform, the time t is inversely proportional to the frequency of the waveform, and so the amplitude of electrophoretic motion is also inversely proportional to the frequency.

At frequencies (typically above about 50 Hz) where the distance of electrophoretic motion is small compared to the thickness of the electrophoretic medium (e.g., vertically in FIGS. 1 to 3), the electrophoretic motion is not very significant, allowing the dielectrophoretic motion to dominate. The dielectrophoretic motion is present at all drive frequencies, but increasing the drive frequency reduces the amplitude of electrophoretic motion, thus allowing dielectrophoretic motion to move the particles without interference from significant electrophoretic motion, thus bringing about dielectrophoretically-induced particle configurations, examples of which have already been discussed with reference to FIGS. 2 and 3.

Figure 12A:
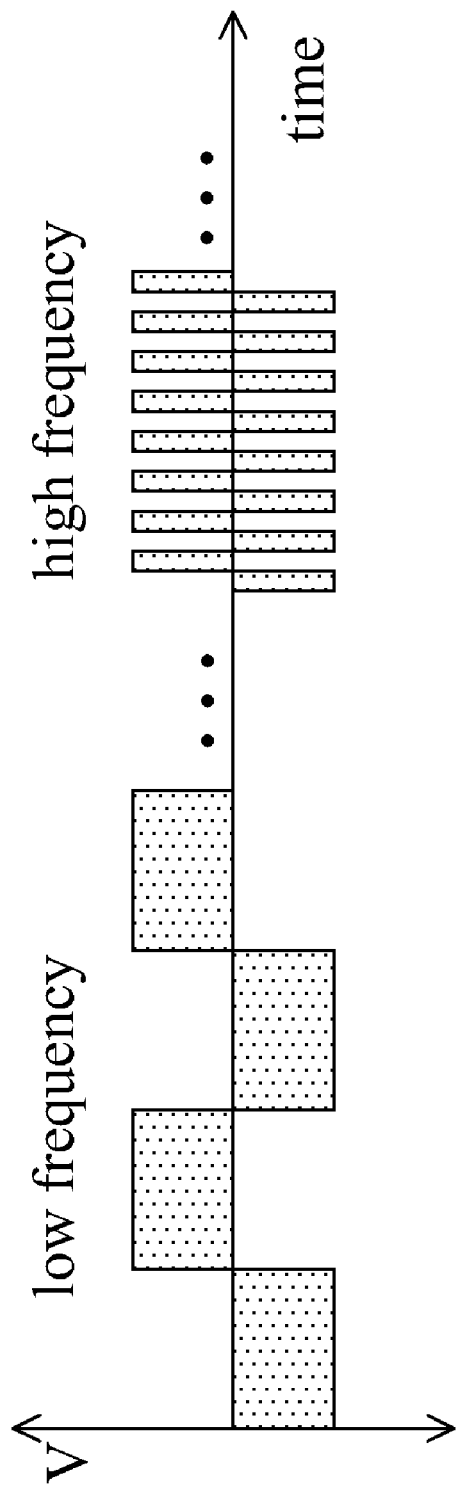
FIGS. 12A and 12B show two waveforms useful in a varying frequency method of the present invention.
Figure 12B:
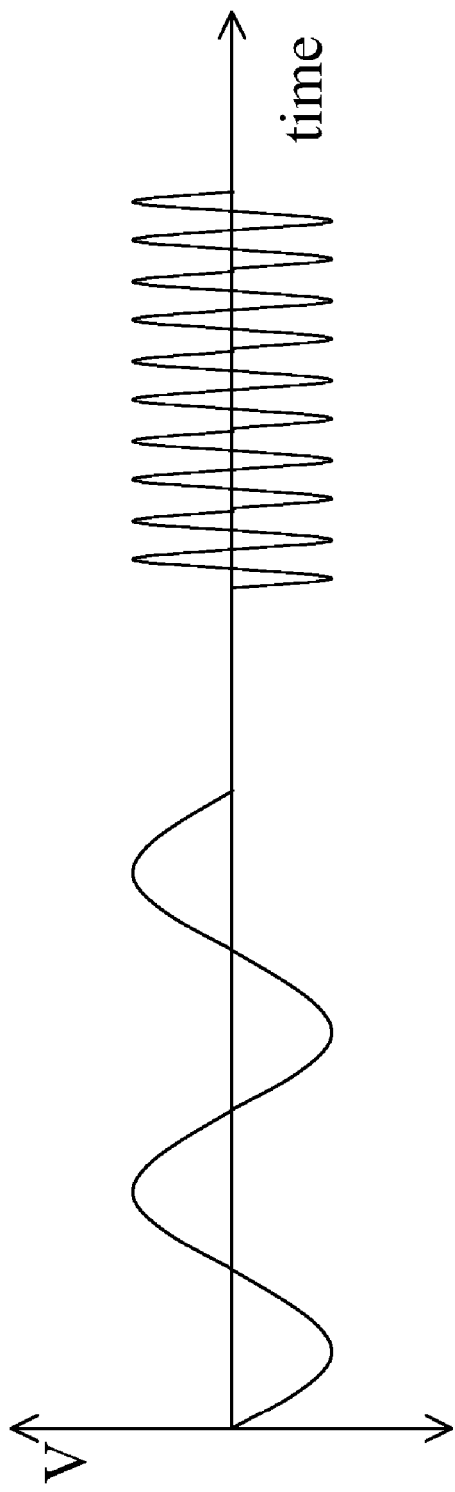

Thus, a display can be switched from electrophoretically-induced particle configurations (where particles are relatively uniformly distributed across the electrophoretic medium and the viewing surface) to dielectrophoretically-induced particle configurations (where particles are aggregated into chains or in small regions of the electrophoretic medium, so that they occupy only a minor proportion of the viewing surface) by changing the frequency of the applied periodic drive voltage. Intermediate configurations can be achieved by choosing intermediate drive frequencies, that is to say particle configurations between electrophoretically-induced and dielectrophoretically-induced types can be achieved by intermediate frequencies. Examples of waveforms for such switching are shown in FIGS. 12A and 12B, where FIG. 12A illustrates a drive scheme using square waves, while FIG. 12B illustrates a drive scheme using sine waves. The cross-over from "low frequency" to "high frequency" is a function of the specific display medium used, but is typically in the range of 10 to 100 Hz. The cross-over occurs approximately across frequency ranges where the electrophoretic motion becomes small, as described above. The range where cross-over occurs can be determined for any given electrophoretic medium by measuring its electro-optic response as a function of frequency of the applied voltage. As already mentioned, the drive scheme can include not only square and sinusoidal waveforms, but also waveforms of other periodic shapes.

Figure 13:
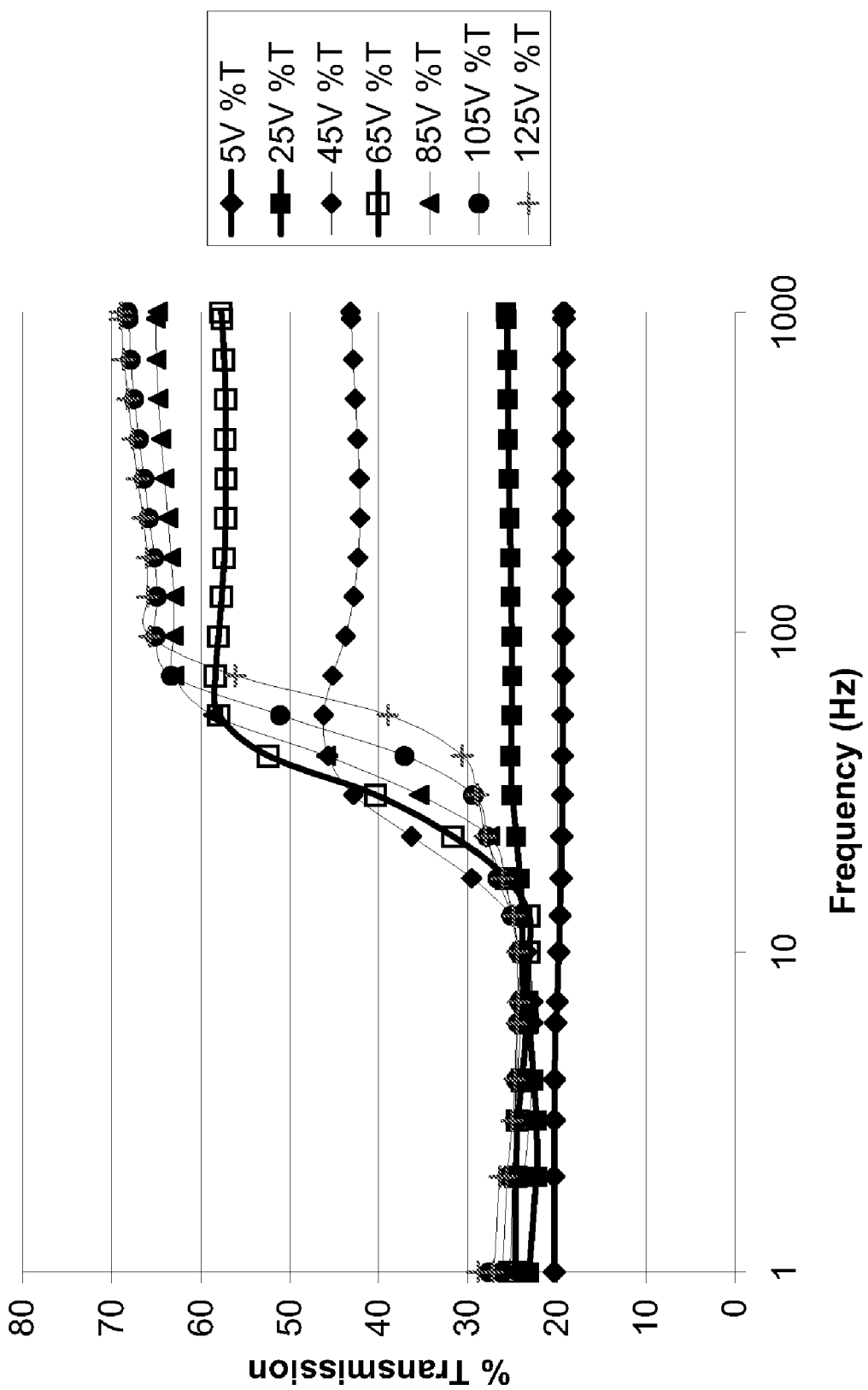
FIG. 13 shows the transmission of an experimental varying frequency display as a function of the applied voltage and frequency.

To illustrate a varying frequency method of the present invention, experimental single pixel displays were prepared by suspending commercial carbon black particles in a hydrocarbon/halocarbon mixture, and encapsulating the resultant internal phase substantially as described in the aforementioned 2002/0180687. The capsules were slot coated on to the ITO-covered surface of one piece of glass, and the resultant sub-assembly was laminated using a lamination adhesive to a second sheet of ITO-coated glass. The resultant single pixel displays were then subjected to square waves of varying frequency and voltage and the transmission of the display measured. The results are shown in FIG. 13, from which it will be seen that, except at the lowest voltages, the transmission of the display varied greatly as a function of the applied frequency, the display being dark (about 20 percent transmissive) at frequencies below about 10 Hz, and highly transmissive (better than 60 percent transmissive) at frequencies above about 100 Hz. Thus, the experimental displays provide the basis for a variable transmission window.

Varying Amplitude Method of the Invention

Figure 14A:
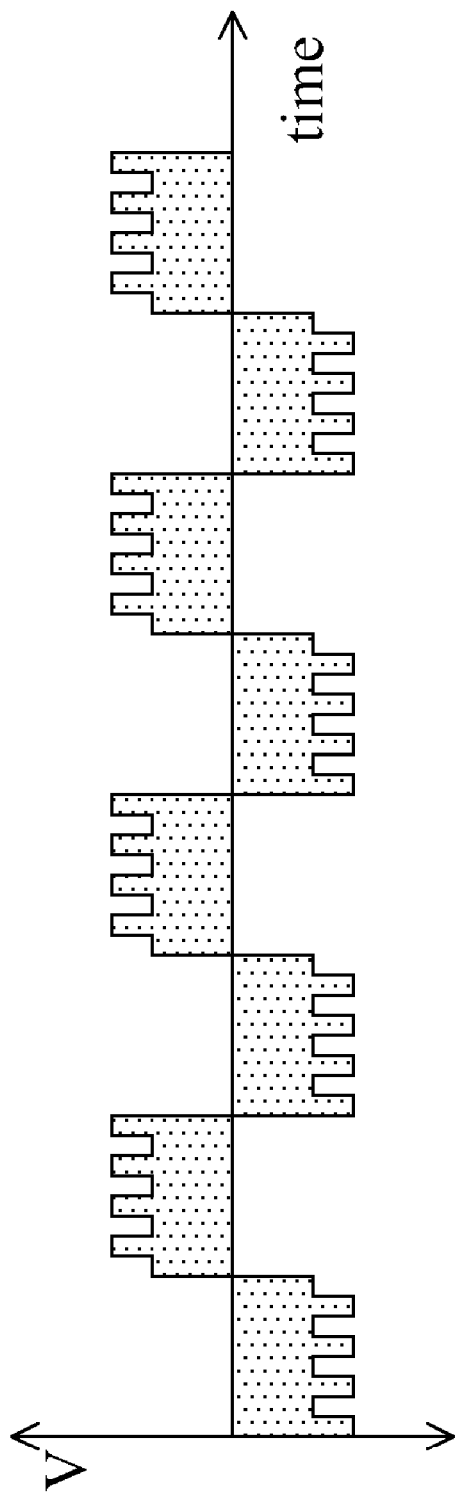
FIGS. 14A and 14B show two waveforms useful in a varying amplitude method of the present invention.
Figure 14B:
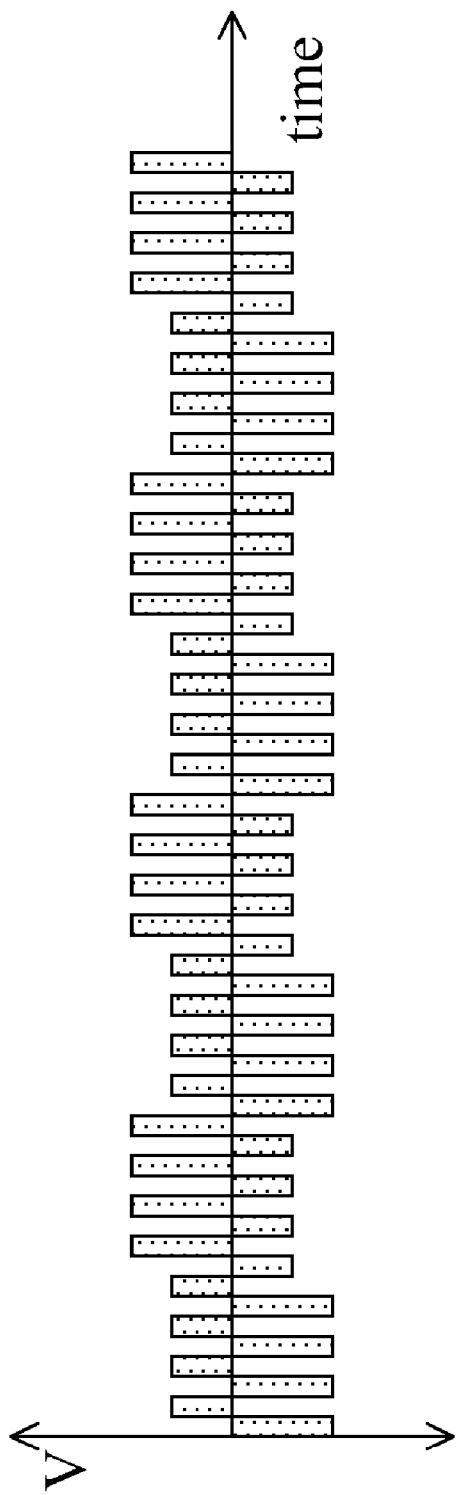

Particles in an electrophoretic medium can also be switched among electrophoretically-induced configurations, dielectrophoretically-induced configurations and intermediate configurations by applying low-frequency and high-frequency waveforms simultaneously, and examples of such waveforms are illustrated in FIGS. 14A and 14B. In FIG. 14A, a high-amplitude, low-frequency square wave is superimposed on a low-amplitude, high-frequency square wave to bring the particle configuration close to an electrophoretically-induced configuration, while in FIG. 14B, a low-amplitude, low-frequency square wave is superimposed on a high-amplitude, high-frequency square wave to bring the particle configuration close to a dielectrophoretically-induced configuration. Waveforms combining high-amplitude, low-frequency components and low-amplitude, high-frequency components drive the particles toward electrophoretically-induced configurations, whereas waveforms combining low-amplitude, high-frequency components and high-amplitude, low-frequency components drive the particles toward dielectrophoretically-induced configurations. Such superposition of waveforms can be achieved by holding one electrode, typically the common front electrode (electrode 106 in FIGS. 1 to 3), at a constant voltage while applying the superposition waveform to the other electrode (typically the pixel electrode). Alternatively, part of the waveform can be applied to the front electrode and the other part to the pixel electrode. For example, the low-frequency part of the waveform can be applied to the pixel electrode while the high-frequency part is applied to the front electrode. It is only necessary that the difference between the voltages applied to the two electrode associated with any specific pixel give the desired superposition waveform.

Further Considerations Regarding Waveforms for Dielectrophoretic Displays

As already mentioned, the dielectrophoretic forces acting on electrophoretic particles are determined in part by gradients in the electric field, as shown in Equations (2) and (4) above. In electrophoretic media driven by parallel electrodes, the field gradients are created by differences in the electrical properties of the various materials used to form the electrophoretic medium. For example, as already mentioned, the dielectrophoretically-induced particle configuration of FIG. 2 can be achieved by using particles that are more polarizable than their fluid as well as capsule wall and/or binder material that is more polarizable than the fluid inside the capsules. This higher polarization can arise from the particles and capsule wall and external components having a higher dielectric constant than the fluid, or can arise because of greater movement of charged species across the particles and across the capsule wall and/or external components. This greater movement of charged species can arise because of a higher ionic or electric conductivity of these components. The degree of ionic response depends on the frequency of the drive voltage. A cutoff frequency, $f_c$, may be defined as:

$$f_c \approx \sigma / \in \quad (6)$$

where $\sigma$ is the conductivity and $\in$ the dielectric constant of a material, both expressed in Gaussian units, so that conductivity has units of inverse time and the dielectric constant is dimensionless. At frequencies below this cutoff frequency the material response is primarily conductive and above this frequency the response is mostly dielectric. This material response is important because it is the contrast in material properties that give rise to gradients in the applied electric field which drives dielectrophoresis.

The existence of a cutoff frequency in the various materials comprising an electrophoretic medium can be used in two ways. Firstly, materials selection and modification can be used to provide enhanced or reduced dielectrophoresis. Secondly, waveforms can be developed that exploit one or more crossover frequencies.

In the materials selection/modification approach, one can choose materials having similar dielectric constants and conductivities when constructing an electrophoretic medium in order to minimize the creation of gradients in the applied electric field. More broadly, one can choose materials whose electrical response is similar over frequency ranges that are relevant to the drive waveforms applied to the medium. For example, one can choose materials with similar dielectric constants and also cutoff frequencies that are all high compared to most of the frequency components comprising the drive voltages. The frequency components of the drive voltage can be determined by Fourier Transform of the drive voltage, and displaying the amplitude of magnitude of the various frequency components. A sine wave drive voltage exhibits only one frequency component and a square wave drive voltage is composed of a series of drive frequencies. However, the magnitude of the frequency components diminishes with increased frequency of each component, so that most of the square wave drive voltage is represented by a fundamental and one or more harmonic Fourier components; the higher terms are less significant because of their low magnitudes.

On the other hand, to enhance dielectrophoretic motion, one could choose materials with strong differences in electric response over the range of dominant frequency components of the drive waveform chosen to induce dielectrophoresis. Contrast can be induced by having materials with widely-differing dielectric constants. Even stronger contrast can be achieved by choosing materials that exhibit dielectric response at the dominant frequencies of the drive waveform along with other components that exhibit conductive response at these frequencies. The former materials have cutoff frequencies high compared to the dominant frequencies of the drive waveform and the latter materials have cutoff frequencies lower than the dominant frequencies of the drive waveform. As an example, an encapsulated electrophoretic medium can be constructed from conductive particles and external polymeric components that have a significant ionic response over accessible drive frequencies (for example, at about 10 to 60 Hertz), and a fluid that does not have significant ionic response at these frequencies; the contrast between the fluid and the particles can induce chaining as illustrated in FIG. 3. Alternatively, the contrast between the external polymeric components and the fluid can give rise to gradients in the electric field strength, which in turn, drive the conductive particles to the side walls of the capsules (or microcells), as illustrated in FIG. 2. Dielectrophoretic response can be further enhanced by choosing particles with a low electrophoretic mobility, because electrophoretic response and dielectrophoretic response compete in controlling particle configuration, and a lower electrophoretic mobility means that the electrophoretic force is smaller, allowing the dielectrophoretic response to become more dominant. A lower electrophoretic response an be achieved, for example, by reducing the electrostatic charge on each particle. Increasing the viscosity of the fluid decreases the electrophoretic response, but, because it simultaneously reduces the dielectrophoretic response (which also scales inversely with solution viscosity), modification of viscosity is not helpful for changing the balance between electrophoretic and dielectrophoretic response.

Given a particular combination of materials, the frequency dependence of the electrical response of constituent materials can be used to create advantageous drive waveforms. A waveform can be developed that adjusts the frequency of the drive voltage to move from above to below a cutoff frequency of a constituent material of the display medium and thus increases or decreases the dielectrophoretic response of the medium. For example, consider a sine wave drive waveform. At very low frequencies, the medium response is electrophoretic, and particles are spread relatively uniformly across the medium. At higher frequencies, electrophoretic motion is reduced in amplitude, so dielectrophoretic response develops, driven by differences between conductive and non-conductive components of the display medium. At even higher frequencies, above the cutoff frequency of all the constituent materials, the response of all the materials is dielectric and the contrast between components is much smaller, so the dielectrophoretic driving force is small. In this way, one can choose, through frequency modulation, among electrophoretic response at low frequency, strong dielectrophoretic response at intermediate frequencies, and weak electrophoretic and weak dielectrophoretic response at high frequencies.

In most cases, electrophoretic particles have insignificant permanent dipole moments, and the particle dipole induced by the electric field is larger than any permanent dipole. Under these conditions, the dielectrophoretic force is proportional to the square of the applied voltage, while the electrophoretic force is, to a good approximation, linear with respect to the applied voltage. Thus, advantageous waveforms can be developed based upon the different dependencies of these two forces on the strength of the applied electric field (and therefore on the applied voltage). Such waveforms can be useful, for example, when the range of frequencies available for the drive waveform is limited, or the speed of one of the electro-optic transitions needs to be increased. Thus, this type of drive uses both frequency and amplitude variation in the drive waveform to shift between electrophoretically-induced particle configurations and dielectrophoretically-induced particle configurations. Essentially, in this type of drive scheme, low voltage and low frequency are used to achieve electrophoretically-induced particle configurations, and high voltage and high frequency to achieve dielectrophoretically-induced particle configurations.

Figure 15A:
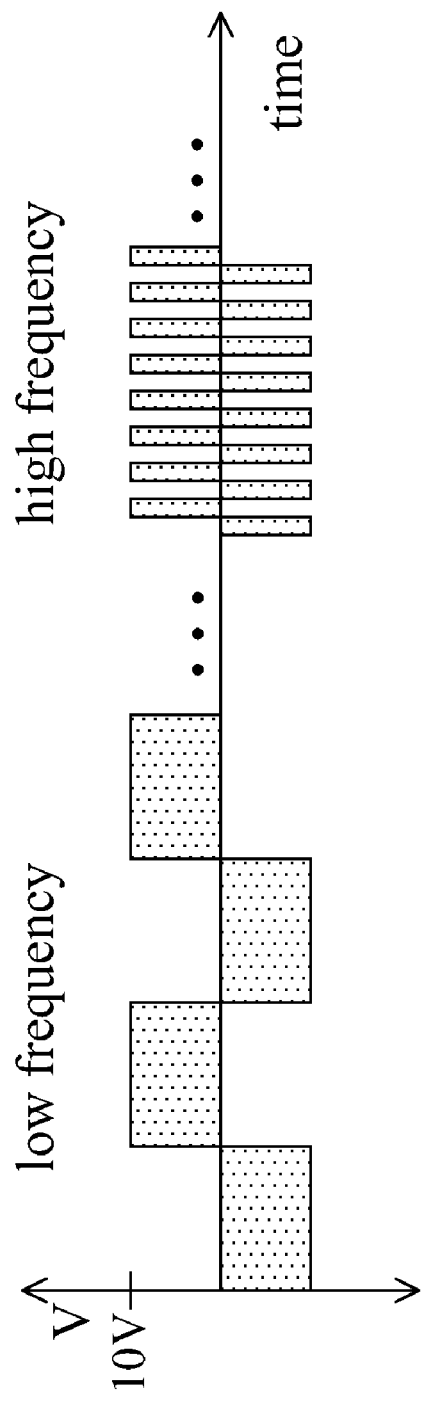
FIGS. 15A-15C, 16A, 16B, 17A and 17B illustrate various modifications of the waveform shown in FIG. 12A in which the application of the high frequency portion of the waveform is applied in an interrupted manner.
Figure 15B:
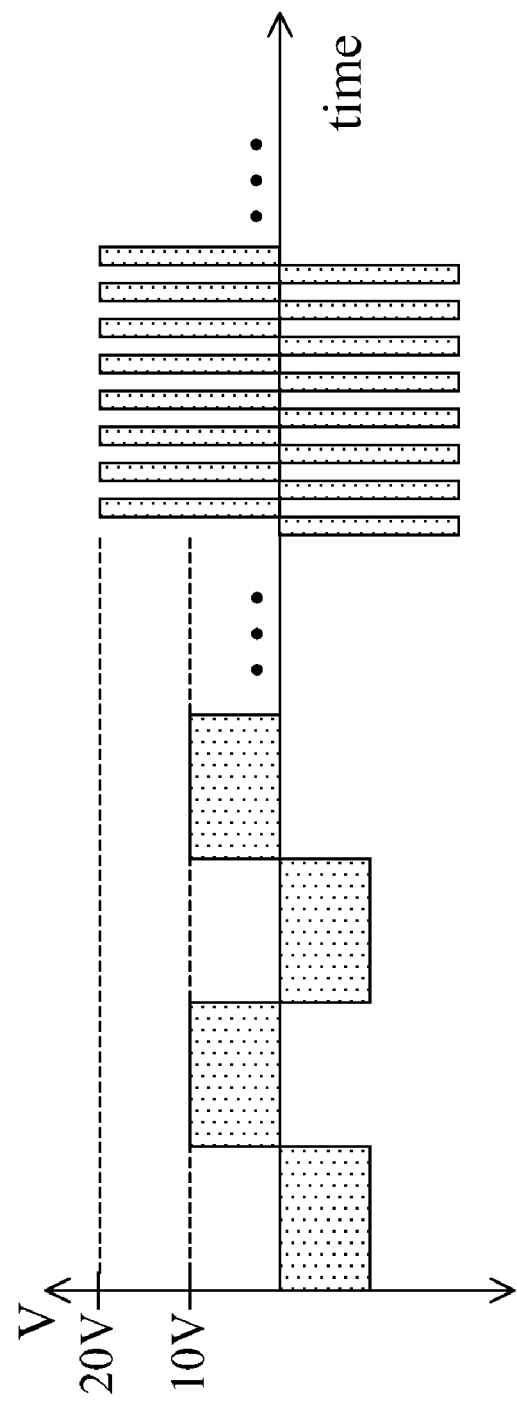
Figure 15C:
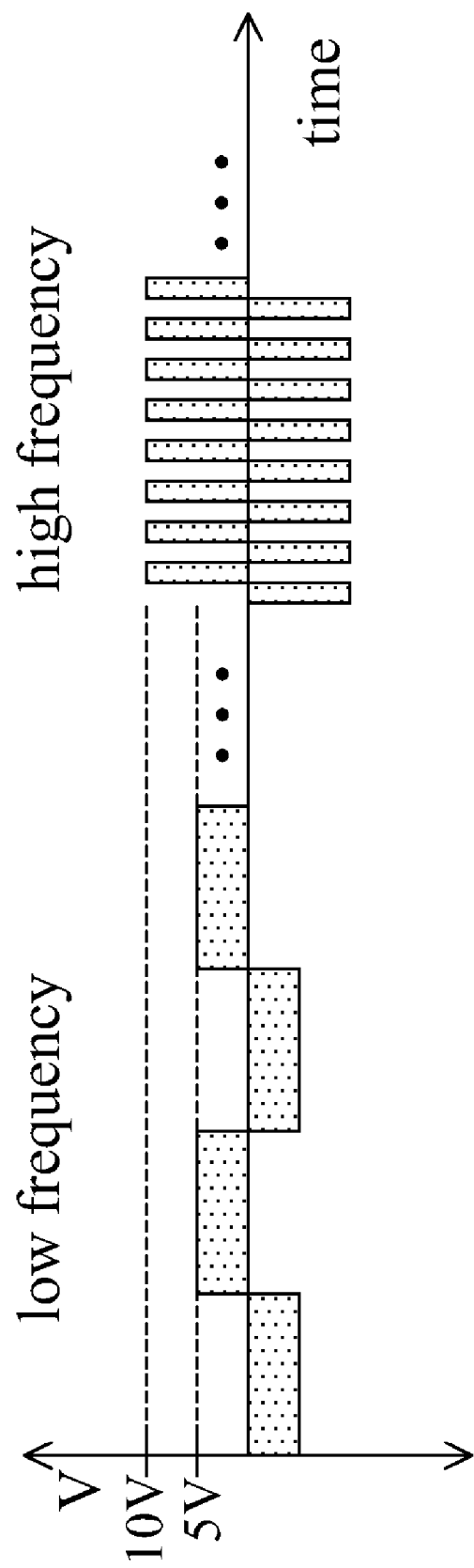

FIGS. 15A-15C illustrate a modified varying frequency method of the present invention using this approach. FIG. 15A (which essentially reproduces FIG. 12A but indicates the drive voltage used) shows a waveform in which a 5 Hz, 10 V square wave is used to drive particles to an electrophoretically-induced configuration, while a 60 Hz, 10 V square wave is used to reduce the amplitude of electrophoretic motion, so that the dielectrophoretic force drives the particles to a dielectrophoretically-induced configuration. In this type of waveform, it may be found that the transition to the electrophoretically-induced particle configuration is sufficiently fast, but the transition to the dielectrophoretically-induced particle configuration is undesirably slow and needs to be accelerated. This can be achieved by increasing the amplitude of the waveform at 60 Hz. For example, increasing the high-frequency voltage amplitude to 20 V, as illustrated in FIG. 15B, will result in a roughly four-times faster transition to the dielectrophoretically-induced particle configuration.

A second modification of the waveform of FIG. 15A is shown in FIG. 15C. In the waveform of FIG. 15A, it may be found that the transitions between the electrophoretically-induced and dielectrophoretically-induced particle configurations are sufficiently fast, but that, at the low frequency drive of 5 Hz, electrophoretic and dielectrophoretic forces compete, resulting in an intermediate particle configuration between the extreme electrophoretically-induced and dielectrophoretically-induced configurations, resulting in only partial switching of the display. In this case, the waveform may be modified as shown in FIG. 15C so that the drive voltage for the low-frequency portion of the waveform is reduced from 10 V to 5 V. This decreases the electrophoretic force by about a factor of two, and reduces the dielectrophoretic force by a factor of about four, thus providing a purer electrophoretically-induced particle configuration from the low-frequency portion of the waveform.

In a third modification (not illustrated) of the waveform of FIG. 15A, the ratio of the dielectrophoretic to the electrophoretic force is modified by changing the applied voltage without changing the waveform frequency. For reasons discussed above, the ratio of dielectrophoretic force to electrophoretic force increases approximately linearly with the applied voltage, so that the applied voltage affects the final particle configuration, and optical states intermediate electrophoretically-induced particle configurations and dielectrophoretically-induced particle configurations can be achieved through voltage modulation of a drive waveform. This method allows grayscale addressing through voltage modulation of an otherwise fixed waveform.

It has also been found advantageous, at least in some cases, to apply the portion of the waveform responsible for the dielectrophoretically-induced particle configurations in an "interrupted" manner, i.e., to apply this portion of the waveform during two or more separate periods, with a different type of waveform section intervening between these periods.

Figure 16A:
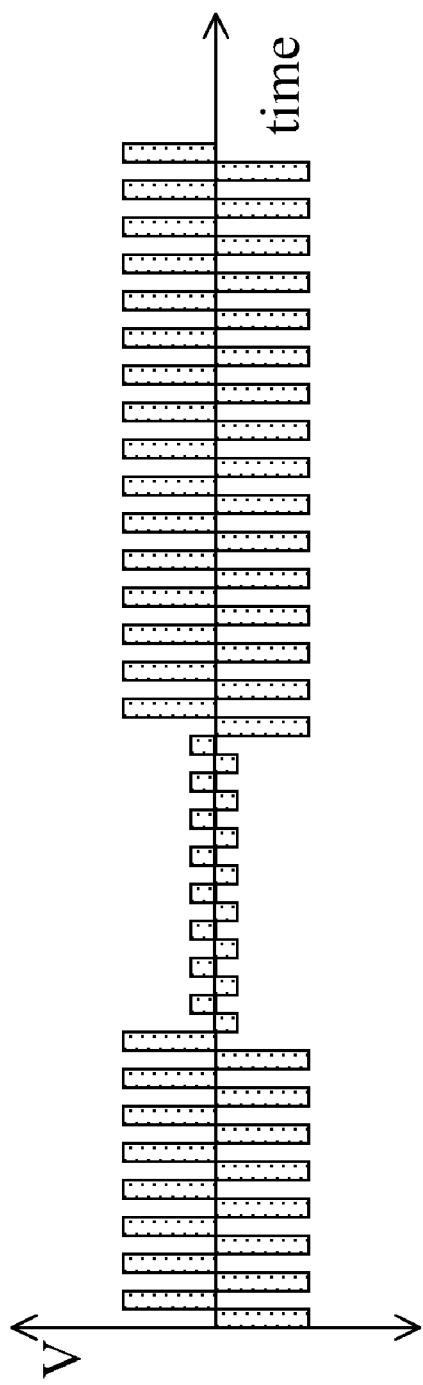
Figure 16B:
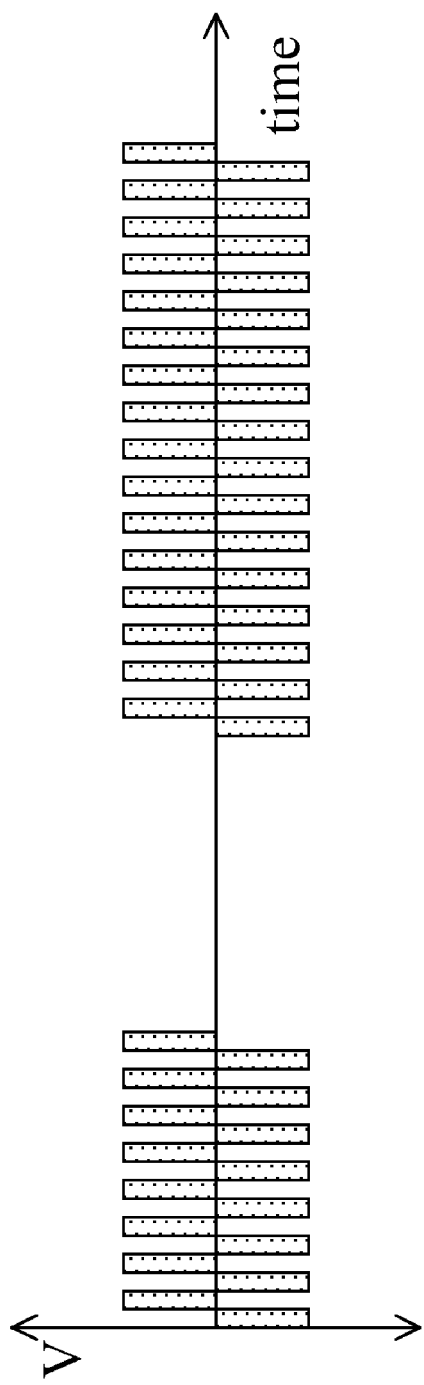

Some quasi-static particle configurations, for example the particle chaining illustrated in FIG. 3, are a result of a "gelling" during a transition to an aggregated state. The particles are originally free to translate, but, once they aggregate under dielectrophoretic forces, their ability to move is greatly hindered by their aggregation. If the initial aggregates were more mobile, these aggregates would further aggregate into a smaller number of tightly-packed aggregates; however, since the initial aggregates are not very mobile, over the time scale relevant to driving of an electrophoretic display, the smaller, more numerous aggregates can be considered quasi-static. It may be desirable to encourage further aggregation of particles to give greater transparency to the electrophoretic medium, because replacing numerous small aggregates with fewer, larger aggregates improves transparency. Additional aggregation can be achieved by temporarily reducing the drive voltage, possibly to zero. This temporary reduction of the drive voltage allows for some particle motion, so that, when the drive waveform is again applied, particles aggregate into coarser structures, or more tightly-packed structures, thus improving the transparency of the display. Examples of this type of waveform are illustrated in FIGS. 16A and 16B (note that unlike FIGS. 15A-15C, FIGS. 16A and 16B, and FIGS. 17A and 17B discussed below, show only the high frequency portion of the waveform, and there is of course a non-illustrated low frequency portion of the waveform similar to that of FIG. 15A). Each of these Figures shows a modification of a high frequency square waveform similar to that shown in FIG. 12A and used to drive the particles to a dielectrophoretically-induced configuration. In FIG. 16A, the voltage of the applied waveform is temporarily reduced, while in FIG. 16B the voltage is temporarily reduced to zero. It should be understood that FIGS. 16A and 16B are schematic, and in practice the period of reduced or zero voltage would typically be greater than is shown in these Figures.

Figure 17A:
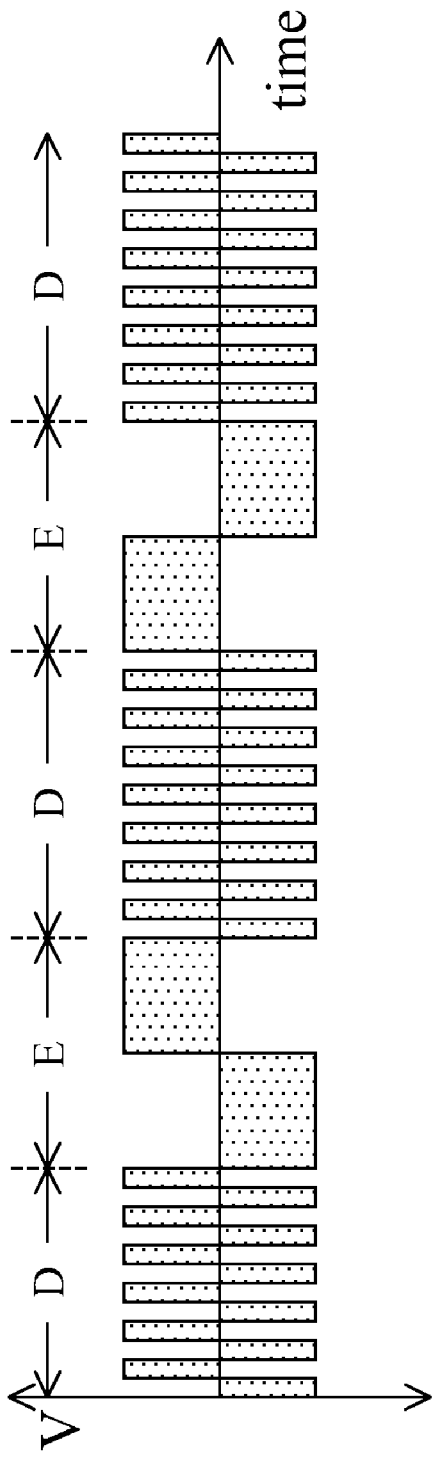
Figure 17B:
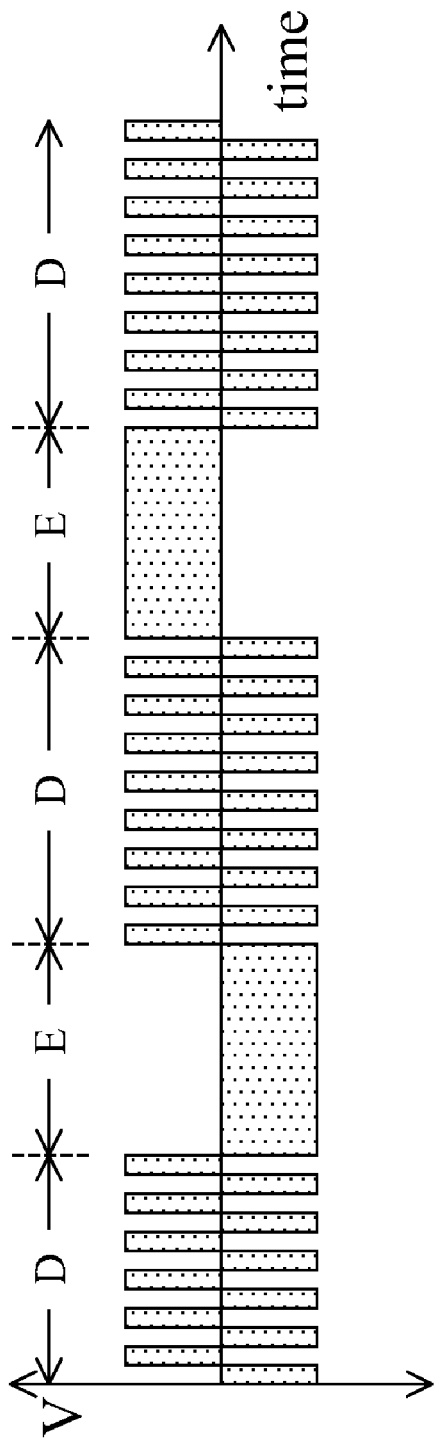

FIGS. 17A and 17B show the high frequency portions of further interrupted waveforms designed to achieve the same objectives as the waveforms of FIGS. 16A and 16B. However, in the waveforms of FIGS. 17A and 17B, the period of reduced or zero voltage is replaced by a period in which a waveform having a lower frequency (designated "E" in FIGS. 17A and 17B) is substituted, so that the waveform alternates between this low frequency waveform E and the high frequency waveform (designated "D" in FIGS. 17A and 17B) used for bringing about dielectrophoresis. Note that in some cases, as illustrated in FIG. 17B, the frequency of the E waveform can be zero, i.e., the E waveform can be a DC waveform.

In this scheme, switching over to waveform E for a short period helps to eliminate some of the more weakly-growing structures that form under waveform D. For example, as already noted, the dielectrophoretic waveform D may cause formation of clusters as shown in FIG. 3 or areas in which electrophoretic particles are driven to the side walls of capsules, as shown in FIG. 2. Cluster growth tends to be rapid because of the short distances which particles need to travel to form clusters, whereas movement of particles to the side walls of capsules tends to be slower because of the greater distances which particles in most parts of the capsule need to travel to reach the side walls. Insertion of the E waveform that drives the particles predominately electrophoretically serves to disperse some of the structures that form under the dielectrophoretic waveform D, especially small clusters in the central regions of the capsule spaced from the side walls thereof. Inserting intervals of the E waveform between periods of D waveform can thus lead to more particles clustered along the side walls of the capsule and fewer particle aggregates spaced from these side walls. Thus, the electrophoretic waveform sections E need to be sufficiently long to remove a portion of the structures formed by dielectrophoresis during the waveform sections D.

As described in several of the aforementioned E Ink patents and applications (see especially 2003/0137521; 2005/0001812; and 2005/0024353), it is highly desirable that the waveform used to drive an electrophoretic display be DC balanced, in the sense that, regardless of the exact sequence of transitions applied to a given pixel, the algebraic sum of the impulses applied to be that pixel is bounded. Accordingly, it is highly desirable that waveforms of the types shown in FIGS. 17A and 17B meet this requirement. Preferred waveforms of this type have the entire waveform DC balanced, that is, the net impulse under the voltage versus time curve is zero. Alternatively, the waveform may be close to DC balanced. For example, the degree of DC imbalance may be bounded in the positive direction by the area under the positive portion of the voltage versus time curve for one cycle of the D waveform and bounded on the negative direction by the area under the negative portion of the voltage versus time curve for one cycle of the D waveform.

It is also desirable that the E portion of the waveform be DC balanced. This can occur, for example, in the two ways shown in FIGS. 17A and 17B. The E sections of the waveform can consist of a single-valued voltage for a finite time duration over one time period, followed by the opposite-signed voltage over the subsequent time period when the E section of the waveform is applied, as shown in FIG. 17B. When an even number of E drive segments is applied, the E portions, in total are DC balanced. Alternatively, each E segment can consist of a positive and a negative voltage segment, these two segments being of equal duration, as shown in FIG. 17A.

It is also desirable that the total DC imbalance of the E portion(s) of the waveform not exceed a predetermined value at any time. The amount of DC imbalance is desirably limited to the area under the voltage versus time curve for the positive portion of one cycle of the E waveform or one time segment of the E waveform, whichever is less. Likewise, the DC imbalance in the negative direction is desirably limited to the area under the negative portion of one cycle of the E waveform or one time segment of the E waveform, whichever is less. In the waveform shown in FIG. 17A, for example, each E segment consists of one cycle, and so the DC imbalance limit in the positive direction is given by the drive voltage times one-half of the duration of one E segment, and in the negative direction by the negative of this amount. In the waveform of FIG. 17B, one full cycle of the E waveform drive extends over two E segments, so the DC imbalance limit is given by the drive voltage times the time of one full E segment in the positive direction and by the negative of this amount in the negative direction.

The various types of waveform described above can be combined with more traditional electrophoretic switching so that, by combining electrophoretic and dielectrophoretic switching, several extreme states can be achieved, along with related intermediate states. For example, in a dual particle electrophoretic medium containing white and black particles (such as that shown in FIG. 1), the medium can be electrophoretically switched at low frequency. The final optical state depends upon where during the low-frequency switching the drive waveform is halted. Halting after a pulse of one polarity in the waveform leaves the white particles near the front, viewing surface of the display, and halting after a pulse of the other polarity in the waveform leaves the black particles near the viewing surface of the display. In this way, the display can be switched between white and black. By applying a waveform that allows dielectrophoretic forces to drive the particle configuration, the display can be rendered relatively transparent by causing the particles to aggregate. One could also electrophoretically address the display to a gray level between white and black, as described in several of the aforementioned E Ink and MIT patents and applications, and switch dielectrophoretically into a relatively transparent optical state.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

What is claimed is:

1. A method for operating a dielectrophoretic display, the method comprising:

providing a dielectrophoretic medium comprising a fluid and a plurality of at least one type of particle within the fluid;

applying to the medium an electric field having a first frequency, thereby causing the particles to undergo electrophoretic motion and producing a first optical state; and applying to the medium an electric field having a second frequency higher than the first frequency, thereby causing the particles to undergo dielectrophoretic motion and producing a second optical state different from the first optical state, wherein the second frequency electric field has a larger magnitude than the first frequency electric field.

2. A method according to claim 1 wherein the dielectrophoretic medium comprises a single type of electrically charged particle in a fluid.

3. A method according to claim 1 wherein the dielectrophoretic medium comprises two different types of electrically charged particles is a fluid, the two different types of particles bearing charges of opposite polarity.

4. A method according to claim 1 wherein the dielectrophoretic medium comprises a continuous phase surrounding a plurality of droplets of the fluid.

* * * * *